(12) United States Patent
Wang et al.

(10) Patent No.: US 11,544,426 B2
(45) Date of Patent: Jan. 3, 2023

(54) SYSTEMS AND METHODS FOR ENHANCED SEQUENTIAL POWER SYSTEM MODEL PARAMETER ESTIMATION

(71) Applicant: General Electric Company, Schenectady, NY (US)

(72) Inventors: Honggang Wang, Clifton Park, NY (US); Weizhong Yan, Clifton Park, NY (US); Kaveri Mahapatra, State College, PA (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 16/601,732

(22) Filed: Oct. 15, 2019

(65) Prior Publication Data
US 2020/0327205 A1    Oct. 15, 2020

Related U.S. Application Data

(60) Provisional application No. 62/833,492, filed on Apr. 12, 2019.

(51) Int. Cl.
*G06F 30/20* (2020.01)
*G06F 30/18* (2020.01)
(Continued)

(52) U.S. Cl.
CPC ............ *G06F 30/20* (2020.01); *G06F 7/58* (2013.01); *G06F 30/18* (2020.01); *G06N 7/005* (2013.01);
(Continued)

(58) Field of Classification Search
CPC G06F 30/18; G06F 30/20; G06F 7/58; G06N 7/005; H02J 3/008
(Continued)

(56) References Cited

U.S. PATENT DOCUMENTS

| 5,390,106 A | 2/1995 | Cederblad et al. |
| 9,092,593 B2 | 7/2015 | Nasle |

(Continued)

FOREIGN PATENT DOCUMENTS

| CN | 103530819 A | 1/2014 |
| CN | 106709626 A | 5/2017 |

(Continued)

OTHER PUBLICATIONS

Calibrating Parameters of Power System Stability Models Using Advanced Ensemble Kalman Filter, (11 pages)). 2012/0191440). (Year: 2018).*

(Continued)

*Primary Examiner* — Andre Pierre Louis
(74) *Attorney, Agent, or Firm* — Armstrong Teasdale LLP

(57) ABSTRACT

A system for enhanced sequential power system model calibration is provided. The system is programmed to store a model of a device. The model includes a plurality of parameters. The system is also programmed to receive a plurality of events associated with the device, receive a first set of calibration values for the plurality of parameters, generate a plurality of sets of calibration values for the plurality of parameters, for each of the plurality of sets of calibration values, analyze a first event of the plurality of events using a corresponding set of calibration values to generate a plurality of updated sets of calibration values, analyze the plurality of updated sets of calibration values to determine a current updated set of calibration values, and update the model to include the current updated set of calibration values.

23 Claims, 15 Drawing Sheets

(51) Int. Cl.
 *G06F 7/58* (2006.01)
 *H02J 3/00* (2006.01)
 *G06N 7/00* (2006.01)
 G06F 119/06 (2020.01)
 G06F 113/04 (2020.01)
 G06F 111/10 (2020.01)
 G06F 111/02 (2020.01)
 G06Q 50/06 (2012.01)
 G06F 17/14 (2006.01)

(52) U.S. Cl.
 CPC .............. *H02J 3/008* (2013.01); *G06F 17/14* (2013.01); *G06F 2111/02* (2020.01); *G06F 2111/10* (2020.01); *G06F 2113/04* (2020.01); *G06F 2119/06* (2020.01); *G06Q 50/06* (2013.01); *H02J 3/003* (2020.01); *H02J 2203/20* (2020.01)

(58) Field of Classification Search
 USPC .......................................................... 703/18
 See application file for complete search history.

(56) References Cited

U.S. PATENT DOCUMENTS

| | | | |
|---|---|---|---|
| 9,557,723 | B2 | 1/2017 | Nasle |
| 9,645,558 | B2 | 5/2017 | Shokooh et al. |
| 9,864,820 | B2 | 1/2018 | Shokooh et al. |
| 10,103,666 | B1* | 10/2018 | Fan ........................... H02P 9/00 |
| 10,371,740 | B2 | 8/2019 | Cui et al. |
| 2007/0055392 | A1 | 3/2007 | D'Amato et al. |
| 2010/0125347 | A1 | 5/2010 | Martin et al. |
| 2012/0191439 | A1 | 7/2012 | Meagher et al. |
| 2012/0191440 | A1* | 7/2012 | Meagher .................. H04L 67/10 703/18 |
| 2015/0127289 | A1* | 5/2015 | Bageshwar ............ G01C 25/00 702/104 |
| 2015/0149128 | A1 | 5/2015 | Baone et al. |
| 2016/0246904 | A1 | 8/2016 | Meagher et al. |
| 2018/0373824 | A1 | 12/2018 | Meagher et al. |
| 2019/0129367 | A1 | 5/2019 | Baone et al. |

FOREIGN PATENT DOCUMENTS

| | | |
|---|---|---|
| CN | 109119999 A | 1/2019 |
| CN | 106786671 B | 5/2019 |
| KR | 101219545 B1 | 1/2013 |
| WO | 2018120893 A1 | 7/2018 |

OTHER PUBLICATIONS

Du, "Generator Dynamic Model Validation and Parameter Calibration using Phasor Measurements at the Point of Connection", 2014 IEEE PES General Meeting | Conference & Exposition, pp. 1-1, National Harbour, MD, USA, Jul. 27, 2014.

Ma et al., "Use Multi-Dimensional Ellipsoid to Monitor Dynamic Behavior of Power Systems Based on PMU Measurement", 2008 IEEE Power and Energy Society General Meeting—Conversion and Delivery of Electrical Energy in the 21st Century, Pittsburgh, PA, USA, pp. 1-8, Jul. 20-24, 2008.

Zarraga., "On-line Extraction of Modal Characteristics from Power System Measurements Based on Hilbert-Huang Analysis", 2009 6th International Conference on Electrical Engineering, Computing Science and Automatic Control (CCE), Conference Location: Toluca, Mexico, pp. 01-06, Jan. 10-13, 2009.

Allen et al., "Algorithm for Screening PMU Data for Power System Events", 2012 3rd IEEE PES Innovative Smart Grid Technologies Europe (ISGT Europe),Conference Location: Berlin, Germany,pp. 1-6, Oct. 14-17, 2012.

Hajnoroozi, A. et al., "Generating unit model validation and calibration through synchrophasor measurements," IEEE Transactions on Smart Grid 6, No. 1(2014):441-449.

Prudhomme et al., "Adaptive Surrogate Modelling for Response Surface Approximations with Application to Bayesian Inference", Advanced Modelling and Simulation in Engineering Sciences, vol. 02, Issue No. 22, Sep. 17, 2015.

Li et al., "Calibration of Dynamic Building Energy Models with Multiple Responses Using Bayesian Inference and Linear Regression Models", Energy Procedia, pp. 979-984, Nov. 2015.

Willett., "Similarity-Based approaches to Virtual Screening", Biochem Soc Trans, pp. 603-606, Jun. 2003.

Conto et al., "Power system model validation", NERC White Paper, Dec. 2010.

Huang et al., "Generator Dynamic Model Validation and Parameter Calibration using Phasor Measurements at the Point of Connection", IEEE Transactions on Power Systems, vol. 28, Issue: 02, May 2013.

Kristensen et al., "Methods for Similarity-based Virtual Screening", Comput Struct Biotechnol, vol. 05, Issue 06, pp. 1-6, 2013.

Jiao et al., "Load Model Verification, Validation and Calibration Framework by Statistical Analysis on Field Data", International Journal of Emerging Electric Power Systems, vol. 18, Issue: 06, pp. 1-7, Nov. 22, 2017.

Xu et al., "Response-Surface-Based Bayesian Inference for Power System Dynamic Parameter Estimation", IEEE Transactions on Smart Grid, pp. 1-11, Jan. 2019.

* cited by examiner

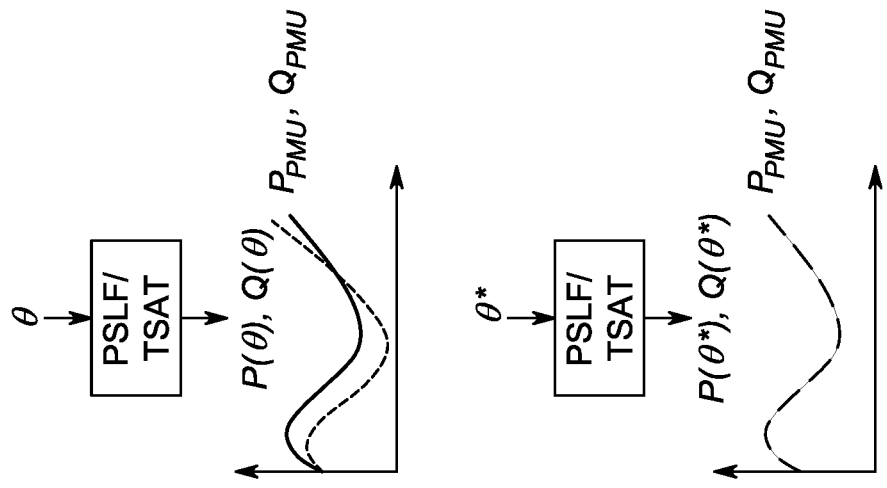

Model calibration algorithm 600

- Model: $y(\theta) = \begin{bmatrix} P(\theta) \\ Q(\theta) \end{bmatrix}$, Measurement: $y^m = \begin{bmatrix} P_{PMU} \\ Q_{PMU} \end{bmatrix}$, where, $P(\theta)$, $Q(\theta)$ are model outputs as a function of parameters $\theta$ $P_{PMU}$, $Q_{PMU}$ are time series PMU measurements

- Goal of model calibration: find $\theta^*$ such that model output matches measurements: $y(\theta^*) \approx y^m$

- Use a three-stage approach to solve this problem:
  Stage 1: Parameter identifiability analysis
  Stage 2: Parameter estimation
  Stage 3: Bayesian optimization

FIG. 5

SYSTEMS AND METHODS FOR ENHANCED SEQUENTIAL POWER SYSTEM MODEL PARAMETER ESTIMATION

CROSS REFERENCE TO RELATED APPLICATIONS

This application claims the benefit of priority to U.S. Provisional Patent Application No. 62/833,492, filed Apr. 12, 2019, entitled "SYSTEMS AND METHODS FOR SEQUENTIAL POWER SYSTEM MODEL PARAMETER ESTIMATION," the entire contents and disclosure of which are incorporated by reference in its entirety.

STATEMENT REGARDING FEDERALLY SPONSORED RESEARCH & DEVELOPMENT

This invention was made with government support under U.S. Government Contract Number: DE-OE0000858 awarded by the Department of Energy. The government has certain rights in the invention.

BACKGROUND

The field of the invention relates generally to sequential power system model parameter estimation, and more particularly, to a system for modeling sequential power systems based on multiple events.

During 1996 Western System Coordinating Council (WSCC) blackout, the planning studies conducted using dynamic models had predicted stable system operation, whereas the real system became unstable in a few minutes with severe swings. To ensure the models represent the real system accurately, North American Electric Reliability Coordinator (NERC) requires generators above 20 MVA to be tested every 5 years or 10 years (depending on its interconnection) to check the accuracy of dynamic models and update the power plant dynamic models as necessary.

Some of the methods of performing calibration on the model include performing staged tests and direct measurement of disturbances. In a staged test, a generator is first taken offline from normal operation. While the generator is offline, the testing equipment is connected to the generator and its controllers to perform a series of predesigned tests to derive the desired model parameters. This method may cost $15,000-$35,000 per generator per test in the United States and includes both the cost of performing the test and the cost of taking the generator offline. Phasor Measurement Units (PMUs) and Digital Fault Recorders (DFRs) have seen dramatic increasing installation in recent years, which allows for non-invasive model validation by using the sub-second-resolution dynamic data. Varying types of disturbances across locations in the power system along with large installed base of PMUs makes it possible to validate the dynamic models of the generators frequently at different operating conditions.

As more and more disturbances in power systems are being recorded by PMUs every day, the North American Electric Reliability Corporation (NERC) has pointed out that the analysis of multiple system events is beneficial for model calibration. A generator or load model built from one or two field tests may not be a good model, since it may overfit some specific event and lack the ability to fit the new, fresh measured load curves. Thus far, the primary questions in the community have been: how to calibrate the model parameters to make maximal use of the multiple events. Accordingly, there exists a need for additional accuracy in model calibration.

BRIEF DESCRIPTION

In one aspect, a system for enhanced sequential power system model calibration is provided. The system includes a computing device including at least one processor in communication with at least one memory device. The at least one processor is programmed to store a model of a device. The model includes a plurality of parameters. The at least one processor is also programmed to receive a plurality of events associated with the device. The at least one processor is further programmed to receive a first set of calibration values for the plurality of parameters. In addition, the at least one processor is programmed to generate a plurality of sets of calibration values for the plurality of parameters. For each of the plurality of sets of calibration values, the at least one processor is programmed to analyze a first event of the plurality of events using a corresponding set of calibration values to generate a plurality of updated sets of calibration values. Moreover, the at least one processor is programmed to analyze the plurality of updated sets of calibration values to determine a current updated set of calibration values. Furthermore, the at least one processor is programmed to update the model to include the current updated set of calibration values.

In another aspect, a system for enhanced sequential power system model calibration is provided. The system includes a computing device including at least one processor in communication with at least one memory device. The at least one processor is programmed to store a model of a device. The model includes a plurality of parameters. The at least one processor is also programmed to receive a plurality of events associated with the device. The at least one processor is further programmed to sequentially analyze the plurality of events in a first order to determine a first set of calibrated parameters for the model. In addition, the at least one processor is programmed to sequentially analyze the plurality of events in a second order using the first set of calibrated parameters to determine a second set of calibrated parameters. Moreover, the at least one processor is programmed to update the model to include the second set of calibrated parameters.

In a further aspect, a system for enhanced sequential power system model calibration is provided. The system includes a computing device including at least one processor in communication with at least one memory device. The at least one processor is programmed to store a model of a device. The model includes a plurality of parameters. The at least one processor is also programmed to receive a plurality of events associated with the device. The at least one processor is further programmed to receive a first set of calibration values for the plurality of parameters. In addition, the at least one processor is programmed to generate an updated set of calibration values for the plurality of parameters based on a first event of the plurality of events and the first set of calibration values. Moreover, the at least one processor is programmed to analyze the updated set of calibration values based on each event of the plurality of events. Furthermore, the at least one processor is programmed to determine an event of the plurality of events to calibrate on based on the analysis. The at least one processor is also programmed to generate a second updated set of calibration values for the plurality of parameters based on the determined event and the updated set of calibration values.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein:

FIG. 5 is a diagram illustrating a model calibration algorithm in accordance with some embodiments.

DETAILED DESCRIPTION

Figure 1:
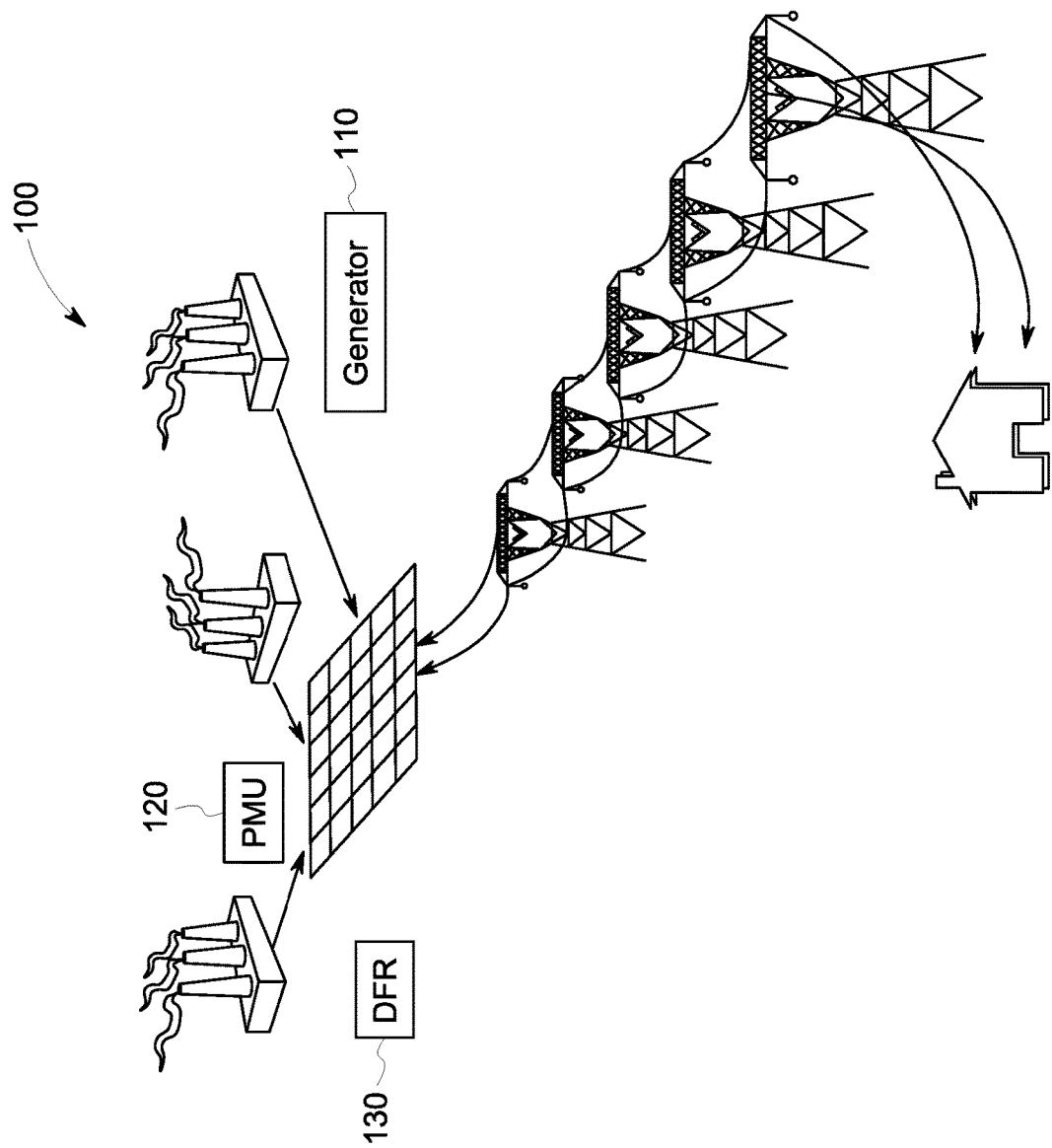
FIG. 1 illustrates a block diagram of a power distribution grid.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "Power System Simulation" refers to power system modeling and network simulation in order to analyze electrical power systems using design/ offline or real-time data. Power system simulation software is a class of computer simulation programs that focus on the operation of electrical power systems. This type of computer programs are used in a wide range of planning and operational situations for example: Electric power generation— Nuclear, Conventional, Renewable, Commercial facilities, Utility transmission, and Utility distribution. Applications of power system simulation include, but are not limited to: long-term generation and transmission expansion planning, short-term operational simulations, and market analysis (e.g. price forecasting). A traditional simulation engine relies on differential algebraic equations (DAEs) therein to represent the relationship between voltage, frequency, active power and reactive power. Those mathematically relationship may be used to study different power systems applications including, but not limited to: Load flow, Short circuit or fault analysis, Protective device coordination, discrimination or selectivity, Transient or dynamic stability, Harmonic or power quality analysis and Optimal power flow.

As used herein, the term "Power System Devices" refers to devices that the simulation engine or simulation model represent may include: Transmission Systems, Generating Units, and Loads. Transmission Systems include, but are not limited to, transmission lines, power transformers, mechanically switched shunt capacitors and reactors, phase-shifting transformers, static VAR compensators (SVC), flexible AC transmission systems (FACTS), and high-voltage dc (HVDC) transmission systems. The models may include equipment controls such as voltage pick-up and drop-out levels for shunt reactive devices. Generating Units include the entire spectrum of supply resources—hydro-, steam-, gas-, and geothermal generation along with rapidly emerging wind and solar power plants. The Load represents the electrical load in the system, which range from simple light-bulbs to large industrial facilities.

As used herein, the term "Model validation" is defined within regulatory guidance as "the set of processes and activities intended to verify that models are performing as expected, in line with their design objectives, and business uses." It also identifies "potential limitations and assumptions, and assesses their possible impact." In the power system context, the Model Validation assures that the model accurately represents the operation of the real system— including model structure, correct assumptions, and that the output matches actual events. There is a reason behind Model Validation for power system asset. The behavior of power plants and electric grids change over time and should be checked and updated to assure that they remain accurate.

The purpose of model validation is to understand the underlying power system phenomena so they can be appropriately represented in power system studies. The eventual goal of the systems described herein is to generate a total system model that can reasonably predict the outcome of an event. However, to achieve this, the individual constituents of the system model need to be valid. The process of model validation and the eventual "validity" of the model require sound "engineering judgment" rather than being based on a simple pass/fail of the model determined by some rigid criteria. This is because any modeling activity necessitates certain assumptions and compromises, which can only be determined by a thorough understanding of the process being modeled and the purpose for which the model is to be used. Component level Model Validation can be done either through staged tests or on-line disturbance based model validation.

As used herein, the term "Model calibration" refers to adjustments of the model parameters to improve the model so that the model's response will match the real, actual, or measured response, given the same model input. Once the model is validated, a calibration process is used to make minor adjustments to the model and its parameters so that the model continues to provide accurate outputs. High-speed, time synchronized data, collected using phasor measurement units (PMUs), are used for model validation of the dynamic response to grid events.

As used herein, the term "Phasor Measurement Unit" (PMU) refers to a device used to estimate the magnitude and phase angle of an electrical phasor quantity (such as voltage or current) in the electricity grid using a common time source for synchronization. Time synchronization is usually provided by GPS and allows synchronized real-time measurements of multiple remote points on the grid. PMUs are capable of capturing samples from a waveform in quick succession and reconstructing the phasor quantity, made up of an angle measurement and a magnitude measurement. The resulting measurement is known as a synchrophasor. These time synchronized measurements are important because if the grid's supply and demand are not perfectly matched, frequency imbalances can cause stress on the grid, which is a potential cause for power outages.

PMUs may also be used to measure the frequency in the power grid. A typical commercial PMU may report measurements with very high temporal resolution in the order of 30-60 measurements per second. Engineers use this in analyzing dynamic events in the grid which is not possible with traditional SCADA measurements that generate one measurement every 2 or 4 seconds. Therefore, PMUs equip utilities with enhanced monitoring and control capabilities and are considered to be one of the most important measuring devices in the future of power systems. A PMU can be a dedicated device, or the PMU function can be incorporated into a protective relay or other device.

As used herein, the terms "Power Grid Disturbance" and "Power Grid Event" refer to outages, forced or unintended disconnection, or failed re-connection of breaker as a result of faults in the power grid. A grid disturbance starts with a primary fault and may also consist of one or more secondary faults or latent faults. A grid disturbance may, for example, be: a tripping of breaker because of lightning striking a line; a failed line connection when repairs or adjustments need to be carried out before the line can be connected to the network; an emergency disconnection due to fire; an undesired power transformer disconnection because of faults due to relay testing; and tripping with a successful high-speed automatic reclosing of a circuit breaker.

PMU recordings of almost any noticeable grid event can be used for model validation. During grid disturbances, a device operates outside of its normal steady-state condition, providing an opportunity to observe the dynamic behavior of the asset during transients. The PMU data from these transient grid disturbances provides information that cannot be captured with SCADA. These transient disturbances often pose the most risk for grid stability and reliability. Some of the grid events that may generate valuable PMU data for model validation purposes include, but are not limited to:

Frequency excursion events—In a frequency excursion event, a substantial loss of load or generation causes a significant shift in electrical frequency, typically outside an interconnection's standard. PMU data on a generator's response to a frequency excursion may be used to examine the settings and performance of models of governor and automatic generation control (used to adjust the power output of a generator in response to changes in frequency).

Voltage excursion events—A fault on the system, a significant change in load or generation (including intermittent renewables), or the loss of a significant load or generation asset can cause voltage shifts. PMU data on a generator's response to a voltage excursion can be used to validate models of its excitation system, reactive capabilities, and automated voltage regulation settings (used to control the input voltage for the exciter of a generator to stabilize generator output voltage).

Device trips—Transmission devices and lines routinely trip out of service. They cause less severe impacts than a frequency or voltage excursion, but can provide similar data sets useful for model validation.

Remedial Action Scheme (RAS) activations—Useful data events for model validation can be caused by a reaction to mitigate grid disturbances. Certain grid disturbances may cause a RAS activation, which will attempt to regulate the grid back to a normal operating condition. In some systems, the RAS may include switching on devices such as shunt reactors, changing FACTS devices, or inserting braking resistance. Activation of the RAS may create additional discrete disturbance events on the system, providing frequency and voltage events that can also be used for model validation.

Probing signals—In the WECC, the high-voltage direct current (HVDC) station at Celilo, Oreg., has the ability to modulate its output power to a known signal, effectively serving as a signal generator into the western power system. These signals can be used to verify and calibrate system-level and generator models' frequency responses, particularly for small-signal-stability analysis.

FIG. 1 illustrates a power distribution grid 100. The grid 100 includes a number of components, such as power generators 110. In some cases, planning studies conducted using dynamic models predict stable grid 100 operation, but the actual grid 100 may become unstable in a few minutes with severe swings (resulting in a massive blackout). To ensure that the models represent the real system accurately, the North American Electric Reliability Coordinator ("NERC") requires generators 110 above 10 MVA to be tested every five years to check the accuracy of dynamic models and let the power plant dynamic models be updated as necessary. The systems described herein consider not only active power (P) and reactive power (Q) but also voltage (U) and frequency (F).

In a typical staged test, a generator 110 is first taken offline from normal operation. While the generator 110 is offline, testing equipment is connected to the generator 110 and its controllers to perform a series of pre-designed tests to derive the desired model parameters. Recently, PMUs 120 and Digital Fault Recorders ("DFRs") 130 have seen dramatic increasing installation in recent years, which may allow for non-invasive model validation by using the sub-second-resolution dynamic data. Varying types of disturbances across locations in the grid 100 along with the large installed base of PMUs 120 may, according to some embodiments, make it possible to validate the dynamic models of the generators 110 frequently at different operating conditions. There is a need for a production-grade software tool generic enough to be applicable to wide variety of models (traditional generating plant, wind, solar, dynamic load, etc. with minimal changes to existing simulation engines. Note that model calibration is a process that seek multiple (dozens or hundreds) of model parameters, which could suffer from local minimum and multiple solutions. There is need for an algorithm to enhance the quality of a solution within a reasonable amount time and computation burdens.

Online performance monitoring of power plants using synchrophasor data or other high-resolution disturbance monitoring data acts as a recurring test to ensure that the modeled response to system events matches actual response of the power plant or generating unit. From the Generator Owner (GO)'s perspective, online verification using high resolution measurement data can provide evidence of compliance by demonstrating the validity of the model by online measurement. Therefore, it is a cost-effective approach for GO as they may not have to take the unit offline for testing of model parameters. Online performance monitoring requires that disturbance monitoring equipment such as a PMU be located at the terminals of an individual generator or Point of Interconnection (POI) of a power plant.

The disturbance recorded by PMU normally consists of four variables: voltage, frequency, active power and reactive power. To use the PMU data for model validation, the play in or playback simulation has been developed and they are now available in all major grid simulators. The simulated output including active power and reactive power will be generated and can be further compared with the measured active power and reactive power.

Figure 2:
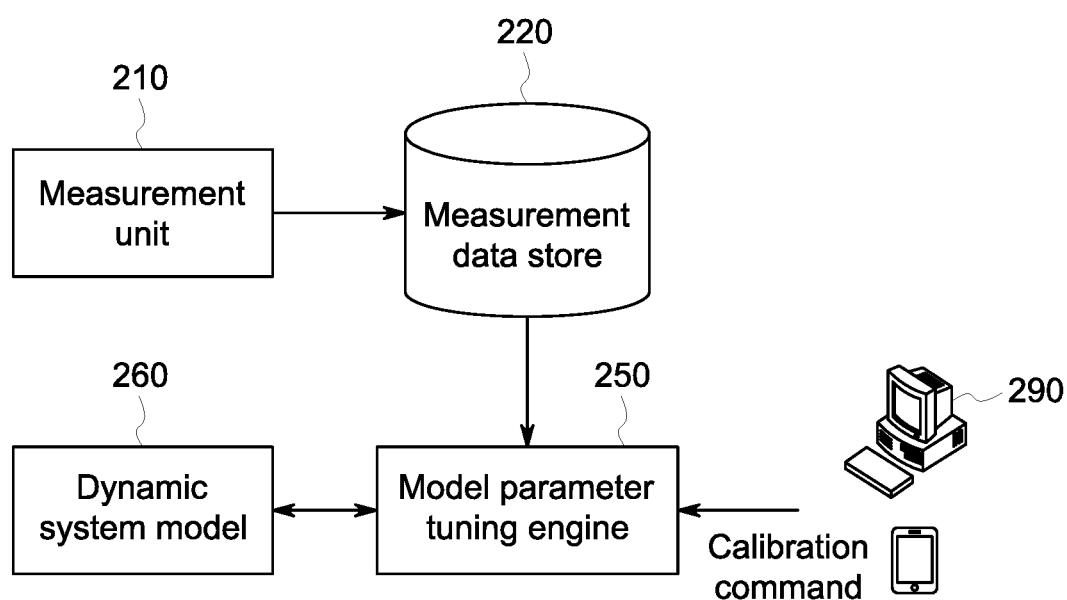
FIG. 2 illustrates a high-level block diagram of a system for performing sequential calibration in accordance with some embodiments.

To achieve such results, FIG. 2 is a high-level block diagram of a system 200 in accordance with some embodiments. The system 200 includes one or more measurement units 210 (e.g., PMUs, DFRs, or other devices to measure frequency, voltage, current, or power phasors) that store information into a measurement data store 220. As used herein, the term "PMU" might refer to, for example, a device used to estimate the magnitude and phase angle of an electrical phasor quantity like voltage or current in an electricity grid using a common time source for synchronization. The term "DFR" might refer to, for example, an Intelligent Electronic Device ("IED") that can be installed in a remote location, and acts as a termination point for field contacts. According to some embodiments, the measurement data might be associated with disturbance event data and/or data from deliberately performed unit tests. According to some embodiments, a model parameter tuning engine 250 may access this data and use it to tune parameters for a dynamic system model 260. The process might be performed automatically or be initiated via a calibration command from a remote operator interface device 290. As used herein, the term "automatically" may refer to, for example, actions that can be performed with little or no human intervention.

Note that power systems may be designed and operated using mathematical models (power system models) that characterize the expected behavior of power plants, grid elements, and the grid as a whole. These models support decisions about what types of equipment to invest in, where to put it, and how to use it in second-to-second, minute-to-minute, hourly, daily, and long-term operations. When a generator, load, or other element of the system does not act in the way that its model predicts, the mismatch between reality and model-based expectations can degrade reliability and efficiency. Inaccurate models have contributed to a number of major North American power outages.

The behavior of power plants and electric grids may change over time and should be checked and updated to assure that they remain accurate. Engineers use the processes of validation and calibration to make sure that a model can accurately predict the behavior of the modeled object. Validation assures that the model accurately represents the operation of the real system—including model structure, correct assumptions, and that the output matches actual events. Once the model is validated, a calibration process may be used to make minor adjustments to the model and its parameters so that the model continues to provide accurate outputs. High-speed, time-synchronized data, collected using PMUs may facilitate model validation of the dynamic response to grid events. Grid operators may use, for example, PMU data recorded during normal plant operations and grid events to validate grid and power plant models quickly and at lower cost.

The transmission operators or Regional reliability coordinators, or Independent System Operators, like MISO, ISO-New England, PG&E, can use this calibrated generator or power system model for power system stability study based on N-k contingencies, in every 5 to 10 minutes. If there is stability issue (transient stability) for some specific contingency, the power flow will be redirected to relieve the stress-limiting factors. For example, the output of some power generators will be adjusted to redirect the power flow. Alternatively, adding more capacity (more power lines) to the existing system can be used to increase the transmission capacity.

With a model that accurately reflects oscillations and their causes, the grid operator can also diagnose the causes of operating events, such as wind-driven oscillations, and identify appropriate corrective measures before those oscillations spread to harm other assets or cause a loss of load.

As used herein, devices, including those associated with the system 200 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The model parameter tuning engine 250 may store information into and/or retrieve information from various data stores, which may be locally stored or reside remote from the model parameter tuning engine 250. Although a single model parameter tuning engine 250 is shown in FIG. 2, any number of such devices may be included. Moreover, various devices described herein might be combined according to embodiments of the present invention. For example, in some embodiments, the measurement data store 220 and the model parameter tuning engine 250 might comprise a single apparatus. The system 200 functions may be performed by a constellation of networked apparatuses, such as in a distributed processing or cloud-based architecture.

A user may access the system 200 via the device 290 (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., when a new electrical power grid component is calibrated) and/or provide or receive automatically generated recommendations or results from the system 200.

The example embodiments provide a predictive model which can be used to replace the dynamic simulation engine when performing the parameter identification and the parameter calibration. This is described in U.S. patent application Ser. No. 15/794,769, filed 26 Oct. 2017, the contents of which are incorporated in their entirety. The model can be trained based on historical behavior of a dynamic simulation engine thereby learning patterns between inputs and outputs of the dynamic simulation engine. The model can emulate the functionality performed by the dynamic simulation engine without having to perform numerous rounds of simulation. Instead, the model can predict (e.g., via a neural network, or the like) a subset of parameters for model calibration and also predict/estimate optimal parameter values for the subset of parameters in association with a power system model that is being calibrated. According to the examples herein, the model may be used to capture both input—output function and first derivative of a dynamic simulation engine used for model calibration. The model may be updated based on its confidence level and prediction deviation against the original simulation engine.

Here, the model may be a surrogate for a dynamic simulation engine and may be used to perform model calibration without using DAE equations. The system described herein may be a model parameter tuning engine, which is configured to receive the power system data and model calibration command, and search for the optimal model parameters using the surrogate model until the closeness between simulated response and the real response from the power system data meet a predefined threshold. In the embodiments described herein, the model operates on disturbance event data that includes one or more of device terminal real power, reactive power, voltage magnitude, and phase angle data. The model calibration may be triggered by user or by automatic model validation step. In some aspects, the model may be trained offline when there is no grid event calibration task. The model may represent a set of different models used for different kinds of events. In some embodiments, the model's input may include at least one of voltage, frequency and other model tunable parameters. The model may be a neural network model, fuzzy logic, a polynomial function, and the like. Other model tunable parameters may include a parameter affecting dynamic behavior of machine, exciter, stabilizer and governor. Also, the surrogate model's output may include active power, reactive power or both. In some cases, the optimizer may be gradient based method including Newton-like methods. For example, the optimizer may be gradient free method including pattern search, genetic algorithm, simulated annealing, particle swarm optimizer, differential evolution, and the like.

Figure 3:
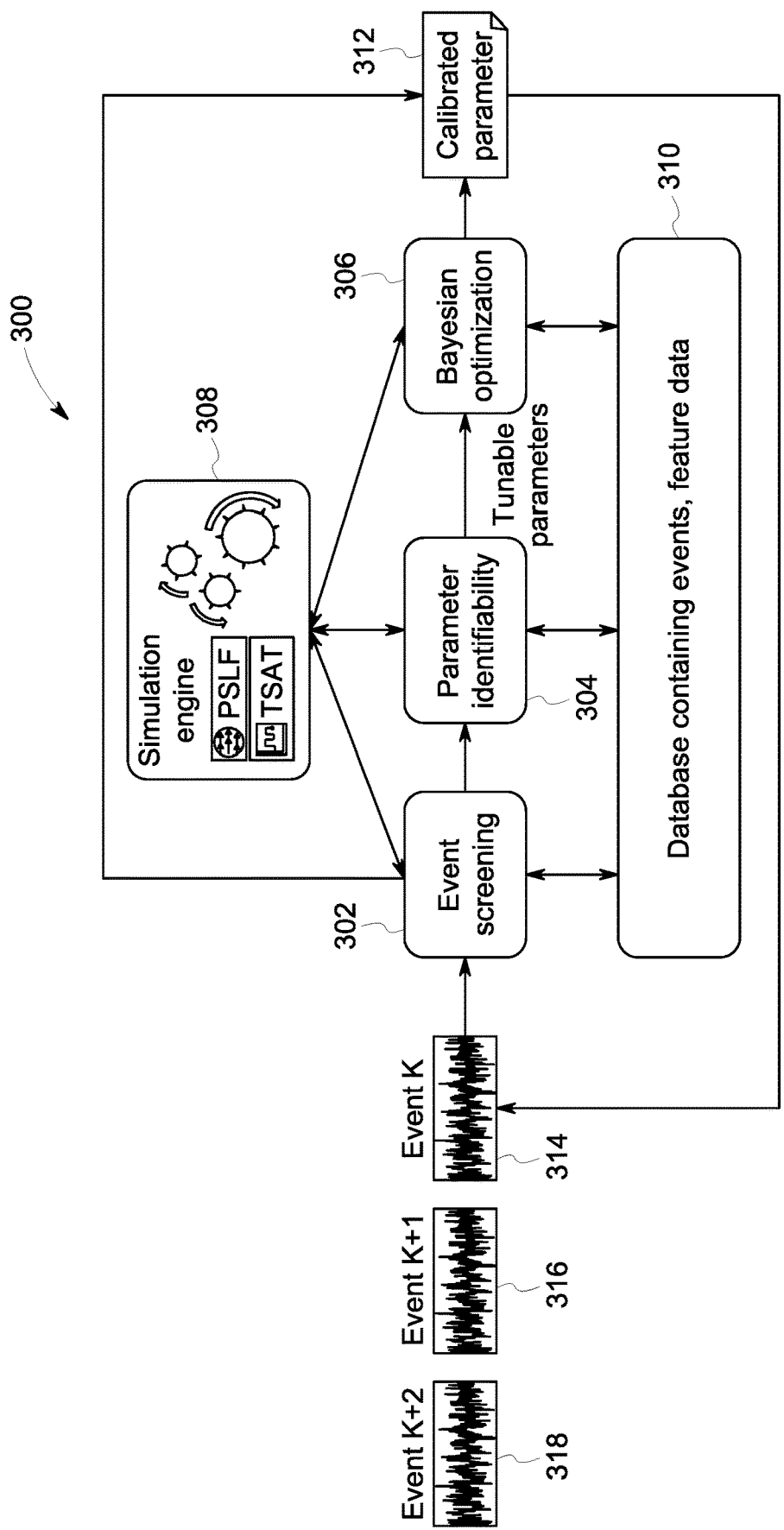
FIG. 3 illustrates a block diagram of an exemplary system architecture for sequential calibration, in accordance with one embodiment of the disclosure.

FIG. 3 illustrates a block diagram of an exemplary system architecture 300 for sequential calibration, in accordance with one embodiment of the disclosure. In the exemplary embodiment, the system 300 receives a plurality of events 314, 316, and 318 sequentially. The events 314, 316, and 318 are received by the event screening component 302, which screens which events 314, 316, and 318 are to be analyzed. Events 314, 316, and 318 are where the voltage and/or the frequency of the power system changes. For each event 314, 316, and 318, the event screening component 302 determines whether the event 314, 316, and 318 is novel enough. For example, an event 316 may be a generator turning on. If the event 316 has the same or similar attributes to a previous event 314, such as that same generator turning on, then the event screening component 302 skips this event 316. In the exemplary embodiment, the event screening component 302 compares the event 316 to those events stored in a database 310. If the event 316 is novel enough, then the event 316 is stored in the database 310. Then the event 316 is sent to the parameter identifiability component 304. This component 304 analyzes the event 316 in combination with past events and the parameters identified as significant with those events to determine which parameters are significant for this event 316. Then the tunable parameters are transmitted to the Bayesian Optimization component 306, which further analyzes the significant parameters to calibrate the parameters in the model being executed by the simulation engine 308 to get a final set of calibrated parameters 312. The steps in this process are further described below.

The first step is the sequential event screening. In the exemplary embodiment, the goal is to screen only the representative or most characteristic events among all events so as to get a faster calculation and avoid overfitting to some specific events. The underlying assumption is that similar input/output (TO) curve features lead to similar dynamics, which in turn leads to similar dynamic parameters.

One approach is to compute a bit-string encoding representative information about the event and use the similarity between the bit-strings as a measure of the similarity between the events. As used herein, a bit-string for an event is similar as the fingerprint in medicine molecules analysis. The fingerprint comprises of a long string with each bit set to either zero or one. Each bit in the fingerprint corresponds to feature of the event, and that bit will be set or not, according to whether the given event has the feature.

The feature of event may comprise peak value, bottom value, overshoot percentage, a rising time, a settling time, a phase shift, a damping ratio, an energy function, and a cumulative deviation in energy, Fourier transformation spectrum information, principal component, steady state gain (P, Q, u, f), of the event. The feature is extracted from the time series of active power, reactive power, voltage and frequency.

One might also represent an event by a counting vector of integers, where each integer counts how many times a certain feature occurs in the molecular. A counting vector allows for a more detailed description of the event as a multi-set of features, where a binary fingerprint as introduced above simply describes the event as a set of features. However, as counting vectors can easily be converted into binary vectors. An example of the counting vectors and binary vectors may be seen in FIG. 4A.

The second step is the Sequential parameter identifiability. The goal of this step is to perform a comprehensive identifiability study across multiple events and provide an identifiable parameter set for the simultaneous calibration which tunes the most identifiable parameters to match the measurement of multiple events simultaneously.

The algorithm first generates the trajectory sensitivity matrices for all the selected disturbances by perturbing each parameter and feeding the perturbed parameter values to a playback simulation platform. Then the algorithm provides two options depending on the number of disturbances being considered. If the number of disturbances is large enough that the union of null spaces of all the disturbances has a rank higher than parameter number, the algorithm solves an optimization problem to find a solution that has the minimum total distance to all the null spaces. Such a solution gives a comprehensive identifiability ranking of parameters across disturbances. If the number of disturbances is small, the second option will be taken, which evaluates the identifiability of parameters for each disturbance, then calculates the average identifiability ranking across disturbances. Since the sensitivity studies are conducted at the parameters' default values, the conditioning tool also performs a global sensitivity consistency study when the parameters' values deviate far away from their default values. Such study portraits the geometry of the parameter sensitivity in the entire parameter space.

When N events are considered, applying singular value decomposition (SVD) to the sensitivity trajectory matrices results in N null spaces. The null space for one event also can be interpreted as a system of homogeneous algebraic equations with parameter sensitivities being the unknowns. Since the null space from one event has a rank lower than the number of parameters, the number of equations is less than the number of unknowns. Considering more events is equivalent to adding more equations to the system. After the event number exceeds certain value (also the characteristic of events should be diverse), the system would have more equations than unknowns. (In practice, the numerical rank should be greater than number of unknowns.) The solution that minimizes the difference between the left and right hand of the equation system represents the comprehensive sensitivity magnitude of all parameters across all the considered events. For sensitivity dependency, accounting for the null spaces of all considered events, a comprehensive dependency index can also be calculated.

The third step is the Bayesian Optimization. Since grid disturbances occur intermittently, the user of the calibration tool may be required to re-calibrate model parameters in a sequential manner as new disturbances come in. In this scenario, the user has a model that was calibrated to some observed grid disturbances to start with, and observes a larger that acceptable mismatch with a newly encountered disturbance. The task now is to tweak the model parameters so that the model explains the new disturbance without detrimentally affecting the match with earlier disturbances. On potential solution is to run calibration simultaneously on all events of interest strung together; however, this comes at the cost of significant computational expense and engineering involved in enabling running a batch of events simultaneously. One more efficient method may be to carry some essential information from the earlier calibrations runs and guide the subsequent calibration run that helps explain the new disturbance without losing earlier calibration matches.

In the exemplary embodiment, the framework of Bayesian estimation may be used to develop a sequential estimation capability into the existing calibration framework. The true posterior distribution of parameters (assuming Gaussian priors) after the calibration process may be quite complicated due to the nonlinearity of the models. One approach in sequential estimation is to consider a Gaussian approximation of this posterior as is done in Kalman filtering approaches to sequential nonlinear estimation. In a nonlinear least squares approach, this simplifies down to a quadratic penalty term for deviations from the previous estimates, and the weights for this quadratic penalty come from a Bayesian argument.

$$\min \sum_{t=1}^{T} w_t * \left( \frac{y_t^t - y_t(x)}{y_{base}} \right) + (x - x_{mean})^T * (\Sigma_b^k)^{-1} * (x - x_{mean})$$

The measured values of P and Q may be represented by a simulated value plus an error term.

$$y_i = y(x_i|b) + e_i$$

$$\Sigma_b^k = \Sigma_b^{k-1} + J^T * J$$

In some embodiments, the errors may be subject to Normal distribution, either independently or else with errors correlated in some known way, such as, but not limited to, multivariate Normal distribution.

$$e_i \sim N(0, \sigma_i)$$

$$e \sim N(0, \Sigma)$$

The above may be used to find the parameters of a model b from the data.

$$P(b|\{y_i\}) \propto P(\{y_i\}|b)P(b) \propto \prod_i \exp\left[-\frac{1}{2}\left(\frac{y_i - y(x_i|b)}{\sigma_i}\right)^2\right] P(b) \propto$$

$$\exp\left[-\frac{1}{2}\sum_i \left(\frac{y_i - y(x_i|b)}{\sigma_i}\right)^2\right] P(b) \propto \exp\left[-\frac{1}{2}x^2(b)\right] P(b)$$

Alternatively, the parameter value $b_0$ that minimizes $x^2$ may be calculated using a Taylor series approximation.

$$-\frac{1}{2}x^2(b) \approx -\frac{1}{2}x_{min}^2 - \frac{1}{2}(b - b_0)^T \left[\frac{1}{2}\frac{\partial^2 x^2}{\partial b \partial b}\right](b - b_0)$$

$$P(B|\{y_i\}) \propto \exp\left[-\frac{1}{2}(b - b_0)^T \sum_b^{-1} (b - b_0)\right] P(b)$$

$$\sum_b = \left[\frac{1}{2}\frac{\partial^2 x^2}{\partial b \partial b}\right]^{-1}$$

where $\Sigma_b$ is the covariance of "standard error" matrix of the fitted parameters.

Figure 4:
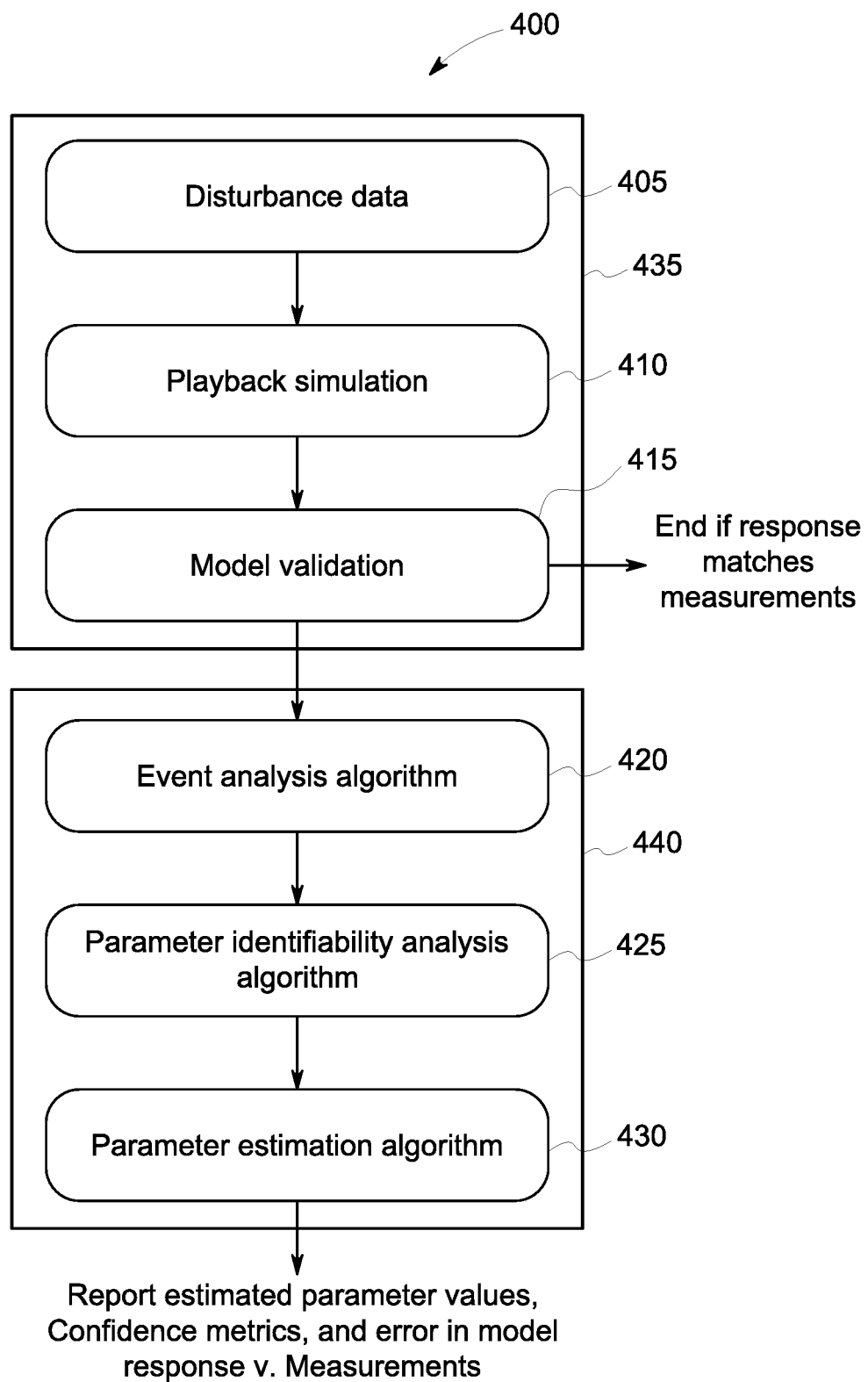
FIG. 4 illustrates a process for power system model parameter conditioning in accordance with some embodiments.

FIG. 4 is a process 400 for power system model parameter conditioning according to some embodiments. At Step 405, disturbance data may be obtained (e.g., from a PMU or DFR) to obtain, for example, V, f, P, and Q measurement data at a Point Of Interest ("POI"). At Step 410, a playback simulation may run load model benchmarking using default model parameters (e.g., associated with a Positive Sequence Load Flow ("PSLF") or Transient Security Assessment Tool ("TSAT")). At Step 415, model validation may compare measurements to default model response. If the response matches the measurements, the framework may end (e.g., the existing model is sufficiently correct and does not need to be updated). At Step 420, an event analysis algorithm may determine if event is qualitatively different from previous events. At Step 425, a parameter identifiability analysis algorithm may determine most identifiable set of parameters across all events of interest. For example, a first event may have 90 to 100 parameters. For that event, Step 425 uses the parameter identifiability algorithm to select 1 to 20 of those parameters.

Finally, at Step 430 an Unscented Kalman Filter ("UKF")/optimization-based parameter estimation algorithm/process may be performed. As a result, the estimated parameter values, confidence metrics, and error in model response (aa compared to measurements) may be reported. In some embodiments, Steps 405-415 are considered model validation 435 and Steps 420-430 are considered model calibration 440. As described elsewhere herein, the systems may use one or both of model validation 435 and model calibration 440. In some embodiments, Steps 405-430 are considered a model validation and calibration (MVC) process 400.

Disturbance data may be monitored by one or more PMUs coupled to an electrical power distribution grid may be received. The disturbance data can include voltage ("V"), frequency ("f"), and/or active and nonactive reactive ("P" and "Q") power measurements from one or more points of interest (POI) on the electrical power grid. A power system model may include model parameters. These model parameters can be the current parameters incorporated in the power system model. The current parameters can be stored in a model parameter record. Model calibration involves identifying a subset of parameters that can be "tuned" and modifying/adjusting the parameters such that the power system model behaves identically or almost identically to the actual power component being represented by the power system model.

In accordance with some embodiments, the model calibration can implement model calibration with three functionalities. The first functionality is an event screening tool to select characteristics of a disturbance event from a library of recorded event data. This functionality can simulate the power system responses when the power system is subjected to different disturbances. The second functionality is a parameter identifiability study. When implementing this functionality, the can simulate the response(s) of a power system model. The third functionality is simultaneous tuning of models using event data to adjust the identified model parameters. According to various embodiments, the second functionality (parameter identifiability) and the third functionality (tuning of model parameters) may be done using a surrogate model in place of a dynamic simulation engine.

Event screening can be implemented during the simulation to provide computational efficiency. If hundreds of events are stitched together and fed into the calibration algorithm unselectively, the algorithm may not be able to converge. To maintain the number of events manageable and still keep an acceptable representation of all the events, a screening procedure may be performed to select the most characteristic events among all. Depending on the type of events, the measurement data could have different characteristics. For example, if an event is a local oscillation, the oscillation frequency in the measurement data would be much faster as compared to an inter-area oscillation event. In some implementations, a K-medoids clustering algorithm can be utilized to group events with similar characteristic together, thus reducing the number of events to be calibrated.

Instead of using the time consuming simulation engine, the surrogate model or models (such as Neural Networks) with equivalent function of dynamic simulation engine, may be used for both identifiability and calibration. The surrogate model may be built offline while there is no request for model calibration. Once built, the surrogate model comprising a set of weights and bias in learned structure of network will be used to predict the active power (P) and reactive (Q) given different set of parameters together with time stamped voltage (V) and frequency (f).

The parameter identifiability analysis addresses two aspects: (a) magnitude of sensitivity of output to parameter change; and (b) dependencies among different parameter sensitivities. For example, if the sensitivity magnitude of a particular parameter is low, the parameter would appear in a row being close to zero in the parameter estimation problem's Jacobian matrix. Also, if some of the parameter sensitivities have dependencies, it reflects that there is a linear dependence among the corresponding rows of the Jacobian. Both these scenarios lead to singularity of the Jacobian matrix, making the estimation problem infeasible. Therefore, it may be important to select a subset of parameters which are highly sensitive as well as result in no dependencies among parameter sensitivities. Once the subset of parameters is identified, values in the active power system model for the parameters may be updated, and the system may generate a report and/or display of the estimated parameter values(s), confidence metrics, and the model error response as compared to measured data.

FIG. 5 illustrates a model calibration algorithm that can be used by the model calibration algorithm component in accordance with some embodiments. Here, the model calibration algorithm attempts to find a parameter value ($\theta^*$) for a parameter (or parameters) of the power system model that creates a matching output between the simulated active power ($\hat{P}$) and the simulated reactive power ($\hat{Q}$) predicted by the model with respect to the actual active power (P) and actual reactive power (Q) of the component on the electrical grid.

As grid disturbances occur intermittently, the user of the calibration tool described herein may be required to re-calibrate model parameters in a sequential manner as new disturbances come in. In this scenario, the user has a model that was calibrated to some observed grid disturbances to start with, and observes a larger that acceptable mismatch with a newly encountered disturbance. The task now is to tweak the model parameters so that the model explains the new disturbance without detrimentally affecting the match with earlier disturbances. One solution would be to run calibration simultaneously on all events of interest strung together but this comes at the cost of significant computational expense and engineering involved in enabling running a batch of events simultaneously. It would be far more preferable to carry some essential information from the earlier calibrations runs and guide the subsequent calibration run that helps explain the new disturbance without losing earlier calibration matches.

In the exemplary embodiment, the framework of Bayesian estimation may be used to develop a sequential estimation capability into the existing calibration framework. The true posterior distribution of parameters (assuming Gaussian priors) after the calibration process can be quite complicated due to the nonlinearity of the models. The typical approach in sequential estimation is to consider a Gaussian approximation of this posterior as is done in Kalman filtering approaches to sequential nonlinear estimation. In our nonlinear least squares approach, this boils down to a quadratic penalty term for deviations from the previous estimates, and the weights for this quadratic penalty come from a Bayesian argument.

Figure 6:
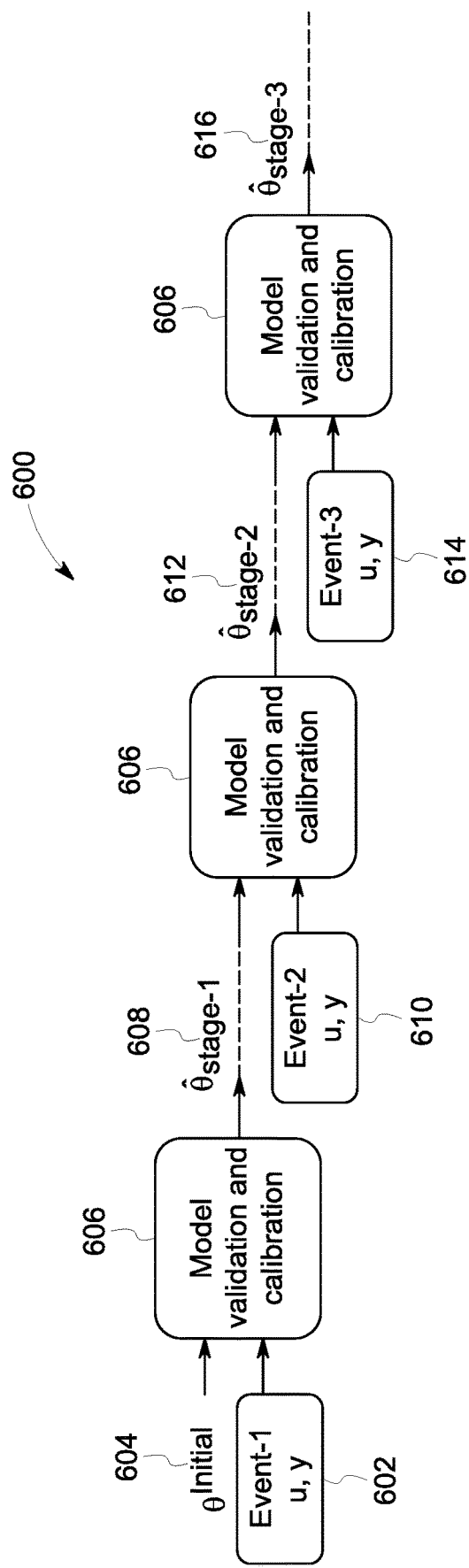
FIG. 6 illustrates a process for sequential calibration using the system architecture shown in FIG. 3.

FIG. 6 illustrates a process 600 for sequential calibration using the system architecture 300 (shown in FIG. 3). In the exemplary embodiment, the system 300 receives a plurality of events, such as events 314, 316, and 318 (shown in FIG. 3) and events 602, 610, and 614. In some embodiments, process 600 is performed by one or more of the system architecture 300, the processor 1510, and the power system disturbance based model calibration engine 1514 (both shown in FIG. 15).

In the exemplary embodiment, process 600 receives initial parameters 604 and chooses a first event 602. In some embodiments, the first event 602 is one of the received plurality of events. In other embodiments, the first event 602 is a historical event or an event designated for testing purposes. The first event 602 and the initial parameters 604 are used as inputs for a model validation and calibration (MVC) process 606, also known as MVC engine 606. In the exemplary embodiment, MVC process 606 is similar to MVC 400. In the exemplary embodiment, the first event 602 includes at least the actual voltage, frequency, active power, reactive power for the event. The MVC process 606 generates a first updated set of parameters 608 based on how the initial parameters 604 matched up with the first event 602. In some embodiments, the MVC process 606 uses the initial parameters 604 and the voltage and frequency to predict the active and reactive power for the first event 602. Then the MVC process 606 compares the predicted active and reactive power to the actual active and reactive power for the first event 602. The MVC process 606 adjusts the initial parameters 604 based on that comparison to generate an updated parameter set 608.

In process 600, the first updated set of parameters 608 are then used with a second event 610 as inputs into the MVC process 606 to generate a second updated set of parameters 612. The second updated set of parameters 612 and then used with a third event 614 to be another set of inputs for the MVC process 606 to generate a third updated set of parameters 616.

In the exemplary embodiment, the process 600 continues to serially analyze events to generate updated parameter sets. For example, if the process 600 receives 25 events, then each event will be analyzed in order to determine updated parameters based on that event and MVC process 606, with the goal being that the parameters allow the MVC process 606 to generate adjusted parameters to accurately predict the outcome of the plurality of events.

By analyzing each event individually and serially rather than as a group or in parallel, process 600 allows for the parameters that affect each event to be analyzed, rather than have events that cancel out the effect of different parameters. For example, considering three different events, event-1, event-2, event-3, the sequential approach shown in process 600 will generated three down-selected parameters subsets, say P-1, P-2 and P-3, corresponding to the three events. Each parameter subset is determined to be the best subset which can describe the corresponding event based on the parameter identifiability algorithm 425. Then the parameter subset P-1, P-2, P-3 may be further used for the parameter estimation process 430 based on the corresponding event. However, the parameter identifiability in a group calibration approach may not reach such an optimality. Furthermore, as the important parameters are identified for each event, and the parameters for each of these events are analyzed overall for the entire set of events. In this way, the parameters for each event contribute to the final parameters and allow the system to find the ideal parameters for the entire set while still taking into account each individual event.

Figure 7:
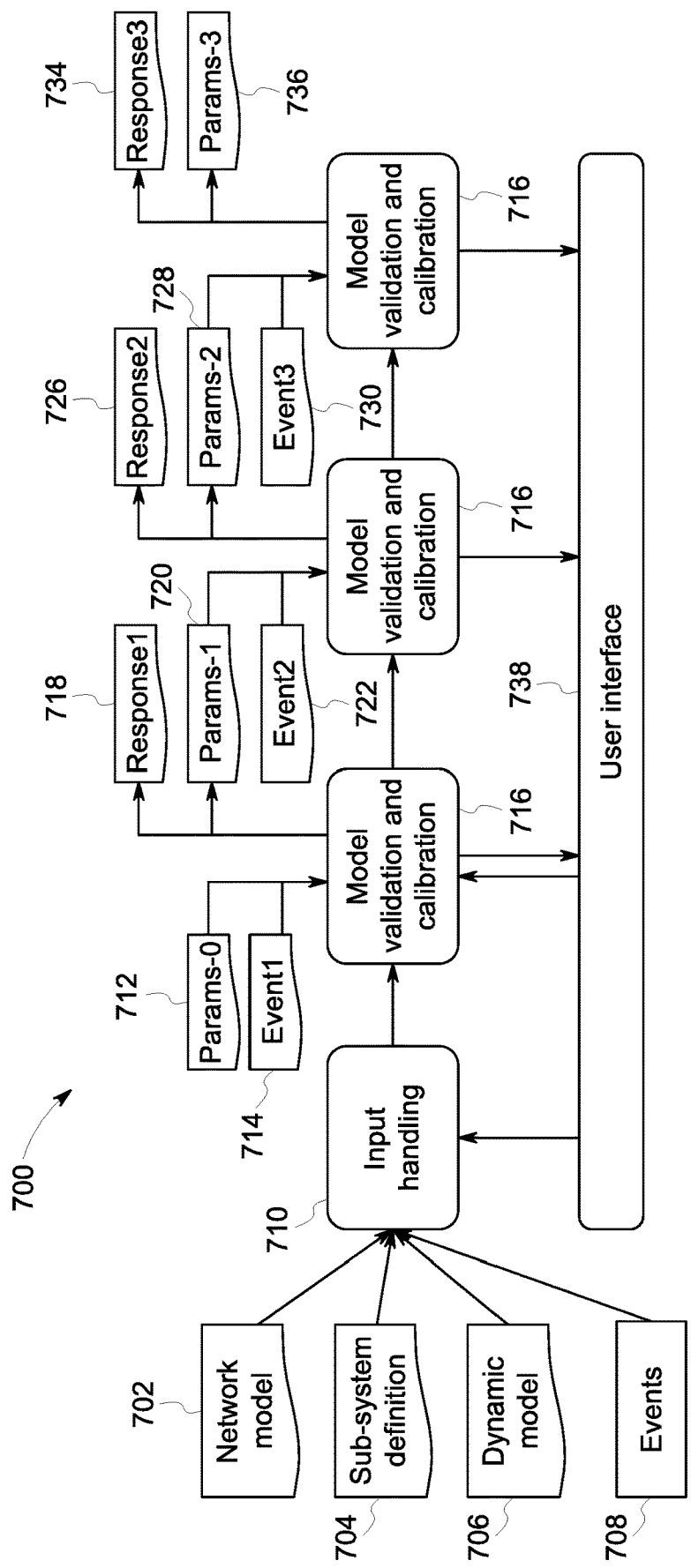
FIG. 7 is a data flow diagram illustrating the architecture system shown in FIG. 3 executing the sequential calibration process shown in FIG. 6.

FIG. 7 is a data flow diagram illustrating a sub-section 700 of the architecture system 300 (shown in FIG. 3) executing the sequential calibration process 600 (shown in FIG. 6). In the exemplary embodiment, the system architecture 700 receives network models 702, sub-system definitions 704, dynamic models 706, and event data 708 at an input handling component 710. In some embodiments, input handling component 710 includes the event screening component 302 (shown in FIG. 3).

Steady state network models 702 (sometimes called as power-flow data) can be either EMS or system planning models. In some embodiments, they may be in e-terra NETMOM or CIM13 format. Dynamic models 706 can be in either PSS/E or PSLF or TSAT format. The system 700 can also accept more than one dynamic data file when data is distributed among multiple files. In the exemplary embodiment, the network models 702 and the dynamic models 706 use the same naming convention for the network elements.

In the exemplary embodiment, the sub-system definitions 704 are based on the network model 702 and one or more maps of the power plant. A sub-system identification module combines the network model 702 and the one or more maps to generate the sub-system definition 704. In some embodiments, the sub-system definition 704 is provided via an XML file that defines the POI(s) and generators that makes up a power plant. Power plants are defined by generators in the plant with its corresponding POI(s). A few examples of power plant sub-system definitions are listed below in TABLE 1.

TABLE 1

| Sub-system name | Sub-system | POI(s) | Generator(s) |
|---|---|---|---|
| S1 | 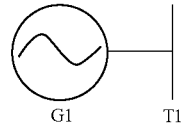 | T1 | G1 |
| S2 | 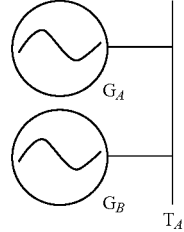 | $T_A$ | $G_A$ $G_B$ |
| S3 | 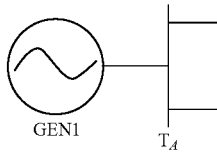 | $T_X$ $T_Y$ | GEN1 |

In the exemplary embodiment, the system 700 provides a user interface 738 to facilitate defining the power plant starting from a potential POI. Potential POIs are identified as terminals/buses in the system having all required measurements (V, f, P, Q) to perform model validation and calibration. A measurement mapping module identifies terminals with V, f, P, Q measurements and lets the user search for radially connected generators starting from potential POIs. Sub-system definitions 704 may also be saved for future use. In some embodiments, a sub-system definition 704 is defined for each event 708.

Events 708 are where the voltage and/or the frequency of the power system changes. For example, an event 708 may be a generator turning on. In some embodiments, the event 708 has the same or similar attributes to a previous event 708, such as that same generator turning on, the event 708 is skipped to reduce redundant processing. In the exemplary embodiment, the event data or Phasor data 708 will be imported from a variety of sources, such as, but not limited to, e-terraphasorpoint, openPDC, CSV files, COMTRADE files and PI historian. In the exemplary embodiment, the POIs will have at least voltage, frequency, real power and reactive power measurements. In some embodiments, voltage angle is substituted for frequency.

The network models 702, sub-system definitions 704, dynamic models 706, and event data 708 are analyzed by the system 700 as described herein. In the exemplary embodiment disclosed herein, the model utilizes multiple disturbance events to validate and calibrate power system models for compliance with NERC mandated grid reliability requirements.

In some embodiments, the user accesses the user interface 738 to set the total number of events 708 that will be used in process 600, set the stored file locations, and set the sequence that the events 708 will be analyzed in.

In the exemplary embodiment, system 700 includes a set of initial parameters 712. In some embodiments, the set of initial parameters 712 are based on the dynamic model 706. The initial parameters 712 and a first event 714 are set as inputs and a model validation and calibration (MVC) 716 is performed using those parameters 712 and that first event 714. In some embodiments, the MVC 716 is performed by the simulation engine 308 (shown in FIG. 3). In some embodiments, the MVC 716 is associated with the MVC process 606 (shown in FIG. 6) and/or the MVC process 400 (shown in FIG. 4). The MVC 716 generates a response 718, which includes statistics about how the initial parameters 712 performed in matching up to the first event 714 based on the MVC process 606. The MVC 716 also generates a first set of updated parameters 720 based on the event's performance in the MVC process 606.

In some embodiments, the MVC 716 uses the initial parameters 712 and the voltage and frequency of the first event 714 to predict the active and reactive power for the first event 714. Then the MVC 716 compares the predicted active and reactive power to the actual active and reactive power for the first event 714. The MVC 716 adjusts the parameters 712 into the first set of updated parameters 720 based on that comparison and also uses the comparison to generate the first response 718.

In the exemplary embodiment, the system 700 uses the first set of updated parameters 720 with the second event 722 into the MVC process 606 to generate a second updated set of parameters 728 and a second response 726. The second updated set of parameters 728 is then used with a third event 730 to be another set of inputs for the MVC process 606 to generate a third updated set of parameters 736 and a third response 734.

In the exemplary embodiment, the system 700 continues to serially analyze events 708 to generate updated parameter sets. For example, if the system 700 receives 25 events 708, then each event 708 will be analyzed in order to determine updated parameters based on that event 708 and the MVC process 606, with the goal being that the parameters allow the MVC process 606 to generate adjusted parameters to accurately predict the outcome of the plurality of events.

In some embodiments, the user may use the user interface 738 to review the responses and the updated parameters. Furthermore, the user interface 738 may allow the user to determine the order that the events 708 are analyzed. In other embodiments, the system 700 may serially analyze the events 708 in a plurality of orders to determine the ideal set of updated parameters.

Embodiment 1: Multiple Starting Method

Figure 8:
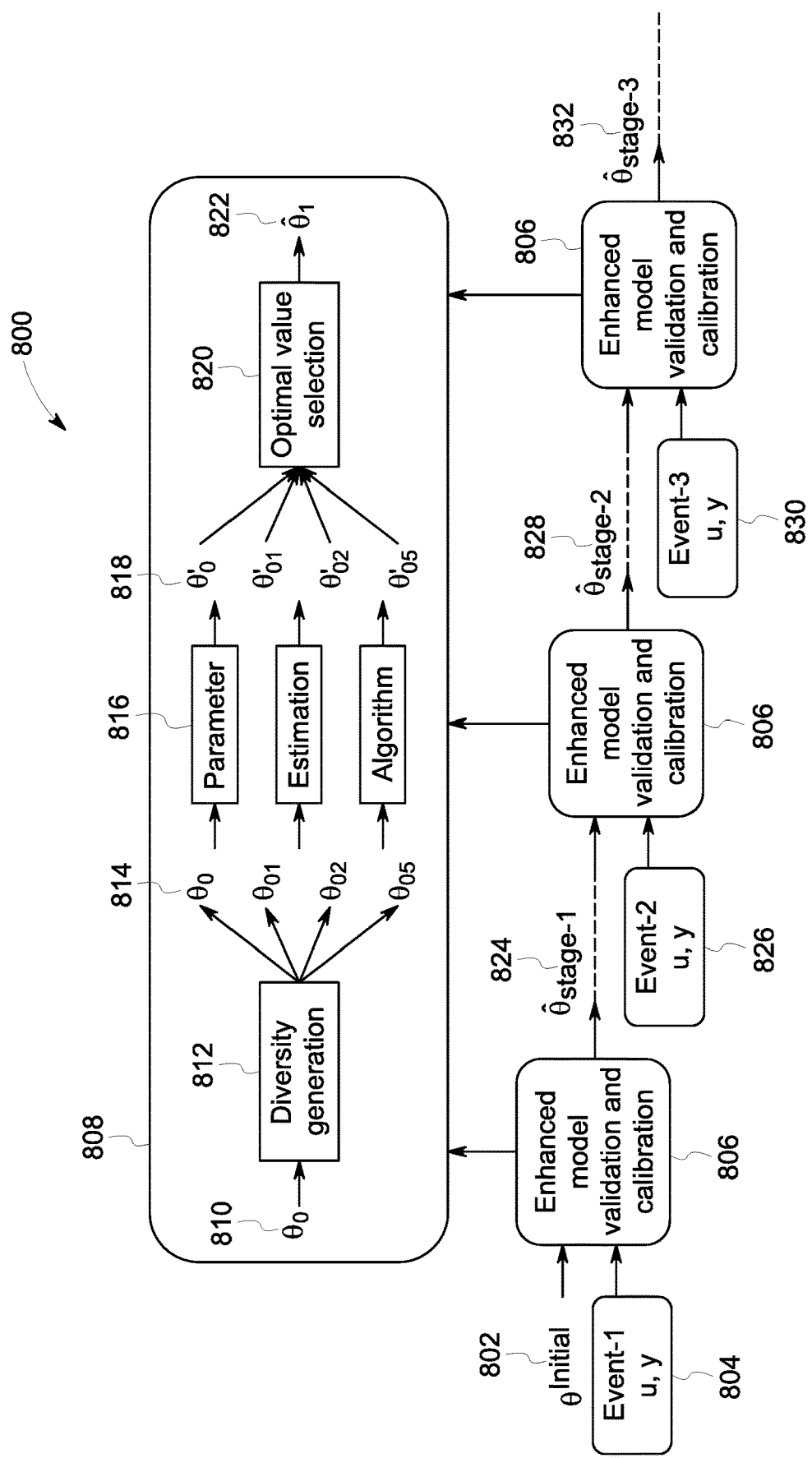
FIG. 8 is a diagram illustrating a method of performing model validation and calibration using multiple starting points for multiple disturbance events in accordance with at least one embodiment.

FIG. 8 is a diagram illustrating a process 800 of performing model validation and calibration using multiple starting points for multiple disturbance events in accordance with at least one embodiment. In the exemplary embodiment, process 800 uses the architecture system 300 (shown in FIG. 3) and sub-section 700 (shown in FIG. 7). Furthermore, process 800 is a variation on process 400 (shown in FIG. 4) and process 600 (shown in FIG. 6).

In the exemplary embodiment, the sequential model calibration approach described herein uses the statistical information of the prior calibration result for the subsequent event calibration. However, in some situations, this optimization method may be sensitive to the initial values, especially if the initial values are far from the true parameter value and the landscape of the objective function has multiple local minima. In some cases, the performance is sensitive to the sequence of events that is used. As different sequences are used, the initial values for model calibration in the subsequent stages may vary. This may lead to different parameter searching results when a deterministic fast gradient based optimization approach is used, thus there is a need for an enhanced version of the sequential approach.

Search methods based on local optimization that aspire to find global optimal values, usually require some type of diversification to overcome local optimality issues. Without diversification, some methods may become localized in a small area of the solution space. This would eliminate the possibility of find a global optimal solution. The multi-start process 800 described herein is one method of diversification to find the optimal solution.

The multi-start process 800 is a variation of process 600 and process 400. In the exemplary embodiment, process 800 receives initial parameters 802 and chooses a first event 804. In some embodiments, the first event 804 is one of the received plurality of events. In other embodiments, the first event 804 is a historical event or an event designated for testing purposes. In the exemplary embodiment, the first event 804 includes at least the actual voltage, frequency, active power, reactive power for the event. The first event 804 and the initial parameters 802 are used as inputs for an enhanced model validation and calibration (eMVC) process 806.

In the exemplary embodiment, eMVC process 806 is based on MVC 400, but includes additional steps. The eMVC process 806 includes two additional steps, one that occurs directly before step 430—the parameter estimation algorithm (shown in FIG. 4). The other occurs directly after step 430. These three steps can be seen in process 808. The first step 812 is to generate a diverse plurality of input parameter sets 814 around the initial values 810. The initial values 810 (also known as the initial parameter set or initial parameter values sets0 are the initial parameters 802. The second step 816 is to generate a plurality of output parameter sets 818 using the parameter estimation algorithm 430 based on the diverse plurality of input parameter sets 814 generated in the first step 812. The third step 820 is to select the optimal solution 822 among the plurality of output parameter sets 818 generated in step 816. The selected value 822 serves as the final calibrated value in current iteration, which is also the initial value for the subsequent iteration of model calibration.

In step 812, the diversity generation is a tradeoff between diversity and optimality. First the high/low bounds for each initial parameter 810 are determined. Then multiple input parameter sets 814 are generated within those bounds. One example method to generate multiple input parameter sets 814 is to use randomly perturbed parameters within 30% range of the current initial values. Another example method is to generate multiple input parameter sets 814 by leveraging the mean and variance of the existing parameter values 810. For example, FIG. 8 shows that five sets of input parameters ($\theta_{01}$-$\theta_{05}$) 814 are generated, plus one copy of the initial parameter values ($\theta_0$) 810. In this example, one generated set is the mean value of the previous parameters 810, the remaining four are generated from multivariate normal random generation around its mean and standard deviation of previous parameter values 810. In some cases, a subset of the parameters may not be changed during this stage, based on their sensitivity to the objective function and/or domain knowledge from subject matter experts. Furthermore, the above example only includes 6 initial parameter sets; however, the number of initial parameter sets may change based on a number of factors including, but not limited to, how the initial parameter sets are generated and available computing resources.

In step 816, the multiple sets of generated input parameters 814 are analyzed using the parameter estimation algorithm 816. This can be implemented in a sequential manner using one computing resource such as by using a single processing core or a single computer. As an alternative, each parameter estimation algorithm 816 may be implemented in parallel, wherein each parameter estimation algorithm 816 may be implemented in one core or a computational cluster. The output of this stage 816 is a plurality of output parameter sets 818 as indicated by $\hat{\theta}_0$-$\hat{\theta}_{05}$ based on the input parameter sets 814. In the exemplary embodiment, the plurality of output parameter sets 818 also includes their corresponding performance metrics such as the response fitting residual error. Each input parameter set 814 is separately used as an input with the current event 804 to the parameter estimation algorithm 816. In other words, input parameter set $\theta_{01}$ 814 is input with the current event into the parameter estimation algorithm 816 to generate output parameter set $\hat{\theta}_{01}$ 818, while input parameter set $\theta_{02}$ 814 is separately input with the current event into the parameter estimation algorithm 816 to generate output parameter set $\hat{\theta}_{02}$ 818.

In the exemplary embodiment, the response fitting residual error is the average value for the mean response error (MRE) across both the trained event and the untrained event. The MRE for a specific event is defined as below:

$$\text{MRE}(\hat{p},k) = \mu[y(u_{event-k}) - \hat{y}(\hat{p}, u_{event-k})], y \in R^{2T}, k=1:K \quad \text{EQ.1}$$

Given the calibrated parameter set $\hat{p}$ for a specific event k, $y(u_{event-k})$ represents the measured response for event k, and $\hat{y}(\hat{p}, u_{event-k})$ represents the simulator's response with the calibrated parameter set $\hat{p}$ for a specific event k. In some embodiments, y could be a stacked vector of both active power P and reactive power Q. $\mu$ is a mathematical operator which may be a mean absolute response error (MARE). For one event with n data points, the MARE may be defined as below. $y_i^S$, $y_i^T$, $y_b$ represents simulated response, true response data and baseline power value. The normalization based on a mean value $y_b$ may make the MARE unitless or dimensionless. In embodiments, where multiple cases or multiple events are compared, the mean value of the MARE across all events is used to generate an aggregated result.

$$MARE = \frac{1}{n}\sum_{i=1}^{n}\left(\left|\frac{y_i^S - y_i^T}{y_b}\right|\right) \quad \text{EQ. 2}$$

In other embodiments, alternative performance metrics for response curve fitting may be used besides of mean response error (MRE). These may include, but are not limited to, a curve-fitting index comprising mean square errors, Manhattan distance or sum of absolute error, short time series distance, cosine based similarity, correlation coefficient, and dynamic time warping, for example, utilized to determine confidence factors A and B.

Mean square errors (MSEs) or a mean squared deviation (MSD) of an estimator (e.g., of a procedure for estimating an unobserved quantity) may be used to measure an average of the squares of errors—that is, the average squared difference between the estimated values and the actual value. MSE is a risk function, corresponding to the expected value of the squared error loss. For example, the fact that MSE is almost always strictly positive (and not zero) is because of randomness or because the estimator does not account for information that could produce a more accurate estimate.

A Manhattan distance comprises a distance between two points measured along axes at right angles. A sum of absolute errors (SAE) comprises a sum of the absolute values of the vertical "residuals" between points generated by a function and corresponding points in the data.

A short time series (STS) distance may comprise a square of the gradient distance between two time series data, for example.

Cosine similarity refers to a measure of similarity between two non-zero vectors of an inner product space that measures the cosine of the angle between them. The cosine of 0° is 1, and it is less than 1 for any angle in the interval (0,$\pi$] radians. A cosine similarity is thus a judgment of orientation and not magnitude: two vectors with the same orientation have a cosine similarity of 1, two vectors oriented at 90° relative to each other have a similarity of 0, and two vectors diametrically opposed have a similarity of −1, independent of their magnitude.

A correlation coefficient may comprise a numerical measure of some type of correlation, meaning a statistical relationship between two variables. The variables may comprise two columns of a given data set of observations, e.g., a "sample," or two components of a multivariate random variable with a known distribution, for example.

Dynamic time warping (DTW) may comprise an algorithm for measuring the similarity between two temporal sequences which may vary in speed. For instance, similarities in walking could be detected using DTW, even if one person was walking faster than the other, or if there were accelerations and decelerations during the course of an observation In step 820, an optimal solution 822 is selected among the plurality of output parameter sets 818. In some embodiments, the selection criteria includes the best performance metric for response curve fitting across all available events, the reasonableness of the solution based on a predefined criteria, or a combination of the two. Other selection criteria may be used as well based on the events, the initial parameters, and/or other factors. The optimal solution 822 is then the first updated set of parameters 824.

Note that the number and range of parameter sets to be generated in each calibration stage 808 may be different to balance the exploration and exploitation. Suppose that there are three events (A, B, and C) to be calibrated, the system may generate 12 solutions with a 50% range of perturbation during calibration of the first event (A). Then the system may generate six solutions with 30% range of perturbation during calibration of the second event (B). Then we may generate six solutions with 15% range of perturbation during calibration of the last event (C). Use of this approach may be used to effectively explore more solutions in the early stage and focus more on exploitation or fine tune the parameters in the latter stage.

The first updated set of parameters 824 are then used with a second event 826 as inputs into the eMVC process 806 to generate a second updated set of parameters 828. The second updated set of parameters 828 are then used with a third event 830 to be another set of inputs for the eMVC process 806 to generate a third updated set of parameters 832.

In the exemplary embodiment, the process 800 continues to serially analyze events to generate updated parameter sets. For example, if the process 800 receives 25 events, then each event may be analyzed in order to determine updated parameters based on that event and eMVC process 806, with the goal being that the parameters allow the eMVC process 806 to generate adjusted parameters to accurately predict the outcome of the plurality of events. In some embodiments, only a subset of the full number of events are processed using the eMVC 806, while other events are processed using the MVC process 606.

In some embodiments, the system 300 generates the input parameter sets 814 with a random perturbation of the initial parameters 802 or initial values 810. In other embodiments, the system 300 generates the input parameter sets 814 with a multivariate normal random generation around the mean and standard deviation of the initial parameters 802 or initial values 810.

Figure 9:
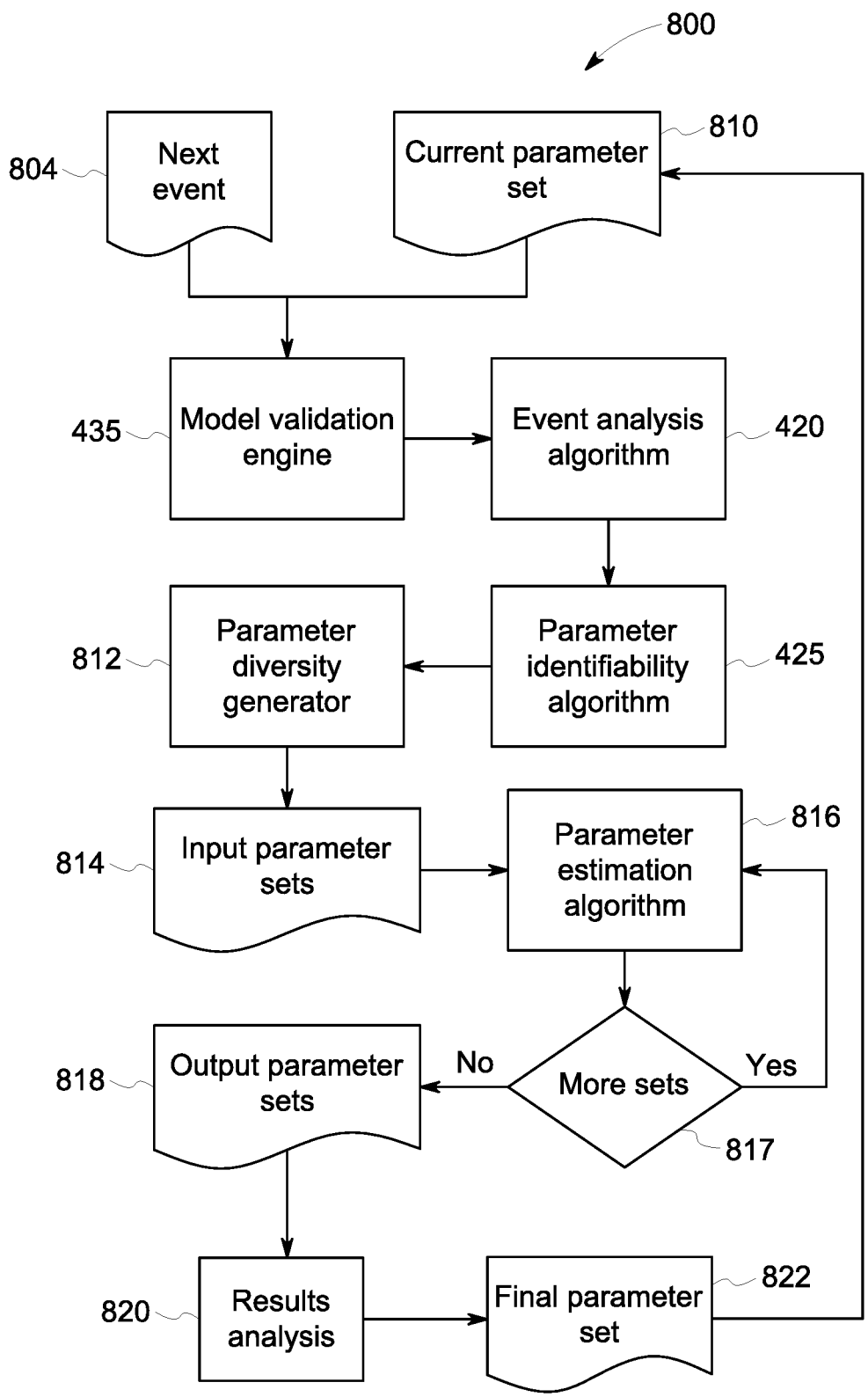
FIG. 9 is another diagram illustrating the method of performing model validation and calibration using multiple starting points for multiple disturbance events as shown in FIG. 8.

FIG. 9 is another diagram illustrating the process 800 of performing model validation and calibration using multiple starting points for multiple disturbance events in accordance with at least one embodiment.

In process 800, the next event 804 is combined with the current parameters 810 as inputs into the model validation engine 435. The model validation engine 435 leads to the event analysis algorithm 420 and the parameter identifiability algorithm 425 of the model calibration engine 440 (shown in FIG. 4). However, instead of proceeding directly to the parameter estimation algorithm 430 (shown in FIG. 4), process 800 uses the parameter diversity generator 812 to generate a plurality of input parameter sets 814 based on the current parameters 810. Then the parameter estimation algorithm 816 is executed for each of the input parameter sets 814. The process 800 continually checks 817 if there are more parameter sets 814. In some embodiments, the parameter estimation algorithm 816 analyzes the input parameter sets 814 serially. In other embodiments, the parameter estimation algorithm 816 analyzes the input parameter sets 814 in parallel.

The process 800 uses the output parameter sets 818 and performs results analysis 820 on the output parameter sets 818 to determine a final parameter set 822. Then that final parameter set 822 is used at the current parameter set 810 for the analysis of the next event 804.

In the exemplary embodiment, system 300 stores a model 702 and 706 (shown in FIG. 7) of a device, such as generator 110 (shown in FIG. 1). The model 702 and 706 includes a plurality of parameters. The system 300 receives a plurality of events 708 (shown in FIG. 1) associated with the device. The system 300 receives a first set of calibration values 802 for the plurality of parameters. The system 300 generates 812 a plurality of sets of calibration values 814 for the plurality of parameters. For each of the plurality of sets of calibration values 814, the system 300 analyzes 816 a first event 804 of the plurality of events 708 using the corresponding set of calibration values 814 to generate a corresponding updated set of calibration values 818. The system 300 analyzes 820 the plurality of updated sets of calibration values 818 to determine a current updated set of calibration values 822. Then the system 300 updates the model 702 and 706 to include the current updated set of calibration values 822.

In some embodiments, the system 300 generates the plurality of sets of calibration values 814 based on the first set of calibration values 810. The system 300 analyzes the first event using the first set of calibration values to generate an updated first set of calibration values and analyzes the plurality of updated sets of calibration values 814 and the updated first set of calibration values 814 to determine the current updated set of calibration values 822.

In some embodiments, the system 300 generates a second plurality of sets of calibrations values 814 based on the current updated set of calibration values 824. For each of the second plurality of sets of calibration values 814, the system 300 analyzes a second event 826 of the plurality of events 708 using the corresponding set of calibration values 814 to generate a corresponding updated second set of calibration values 828. The system 300 analyzes the second plurality of updated sets of calibration values 818 to determine the current updated set of calibration values 828.

For each of the plurality of updated sets of calibration values, the system 300 determines a corresponding residual error between a simulated response and a measured response. The system 300 analyzes the plurality of updated sets of calibration values 818 to select the updated set of calibration values with minimal overall residual error as the current updated set of calibration values 822.

The system 300 sequentially analyzes the plurality of events 708 where the updated set of calibration values associated with an event are used as an input to analyze a subsequent event of the plurality of events.

Embodiment 2: Data Reuse Method

Figure 10:
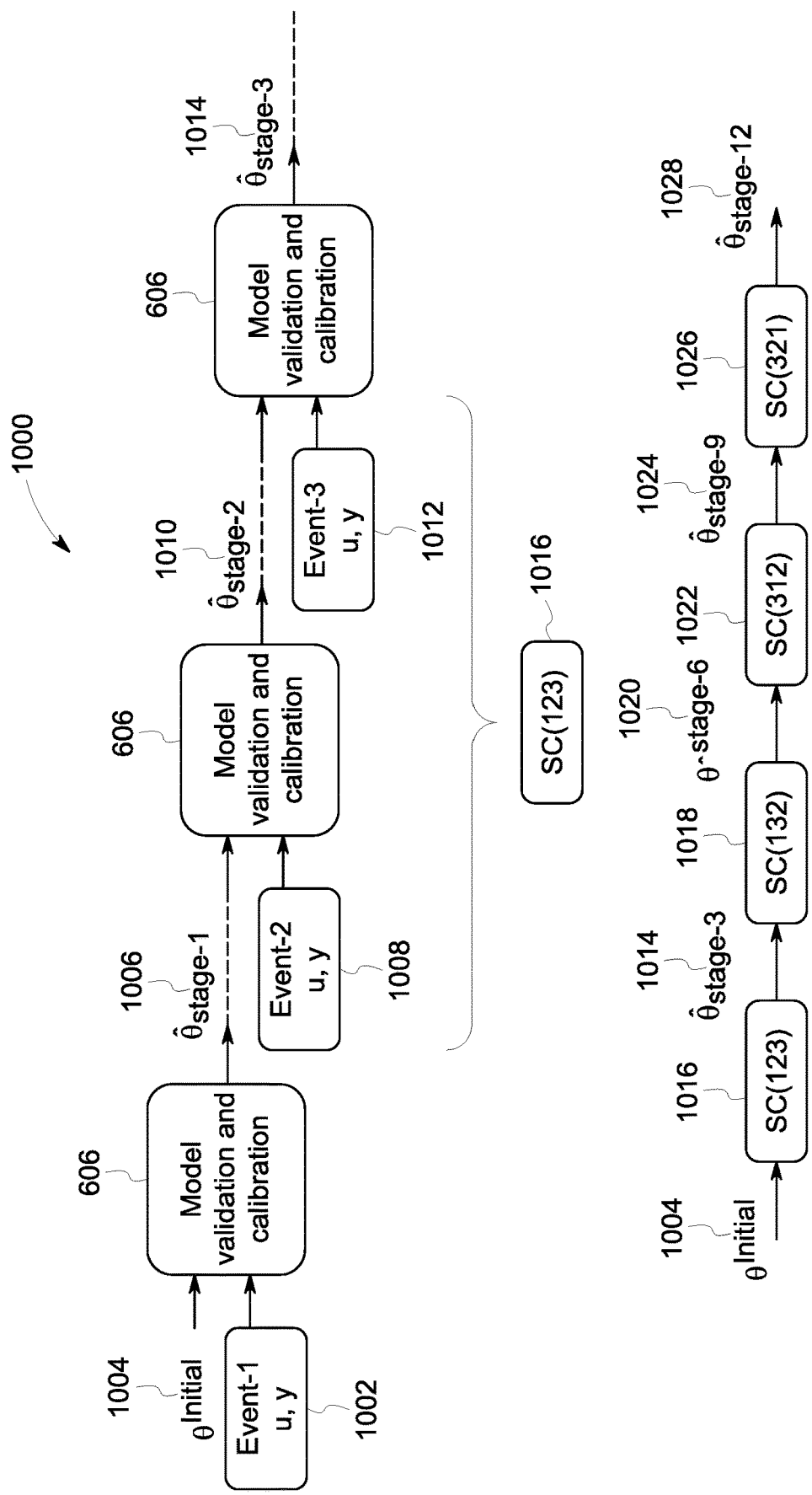
FIG. 10 is a diagram illustrating a method of performing model calibration using a data reuse with multiple disturbance events in accordance with at least one embodiment.

FIG. 10 is a diagram illustrating a process 1000 of performing model calibration using a data reuse method with multiple disturbance events in accordance with at least one embodiment. In the exemplary embodiment, process 1000 uses the architecture system 300 (shown in FIG. 3) and sub-section 700 (shown in FIG. 7). Furthermore, process 1000 is a variation on process 400 (shown in FIG. 4) and process 600 (shown in FIG. 6).

In process 1000 the order of the events are randomized and processed through the MVC process 606 in multiple different orders. In process 1000, multiple random sequences of events are created and the sequences are stacked together to generate a training sequence for multi-event model calibration. For example, the sequence of three events of training may be stated as SC(123), where SC means sequential calibration, and where 123 represents the sequence of event is 1-2-3. Then we can repeat this process using a different sequence, such as SC(132) or SC(312). By stacking different event sequences together, each event may bring in more information about the landscape of parameter searching hyperspace, which may further improve the parameter tuning.

For process 1000, a first event 1002 and initial parameters 1004 are used as inputs for model validation and calibration (MVC) process 606. The MVC process 606 generates a first updated set of parameters 1006 based on how the initial parameters 1004 matched up with the first event 1002. The MVC process 606 adjusts the initial parameters 1004 based on that comparison to generate an updated parameter set 1006. In process 1000, the first updated set of parameters 1006 are then used with a second event 1008 as inputs into the MVC process 606 to generate a second updated set of parameters 1010. The second updated set of parameters 1010 are used with a third event 1012 to be another set of inputs for the MVC process 606 to generate a third updated set of parameters 1014. These three events in that order would be considered the first sequence 1016 SC(123). The system then generates multiple other sequences of events and runs them through the MVC process 606 serially to improve the analysis of the events and parameters. In this example, the multiple sequences of events may include SC(123), SC(132), SC(312) and SC(321).

For example, starting with an initial set of parameters 1004, the parameters are analyzed by ordering the events in the first sequence 1016 SC(123). This outputs the third set of updated parameters 1014 as shown previously. Then the events are reordered into a second sequence 1018 SC(132) and the third set of updated parameters 1014 is used as inputs to generate a second sequence set of updated parameters 1020. The second sequence set of updated parameters 1020 are used as inputs for the third sequence 1022 SC(312) to generate a third sequence set of updated parameters 1024. The third sequence set of updated parameters 1024 are used as inputs for the fourth sequence 1026 SC(321), which generates a fourth sequence set of updated parameters 1028. The three events described here could be used to generate six different sequences and larger numbers of events could generate significantly more potential sequences, where with k events, there would be k! sequences of those events. In some embodiments, only a subset of the available events may be used for sequences. For example, in a set of 25 events, only events numbers 3, 9, 15, and 22 are used. Furthermore, the only a subset of the available sequences may be generated. Continuing the above example, there are 24 potential sequences of those four events, but the system may only use 15 of those sequences.

In some embodiments, the system may execute process 1000 until the parameters generate one or more responses that match the measurements, such as through the model validation step 415 of process 1000 (as shown in FIG. 4). In other embodiments, after executing a sequence, the generated sequence set of updated parameters from that sequence is compared to the sequence set of updated parameters that was used as inputs for this sequence to see if there was any improvement. If there was no improvement, or the amount of improvement was below a threshold, then the system may end process 1000. In some further embodiments, the system may analyze multiple events, such as through model validation 435 (shown in FIG. 4), using the sequence set of updated parameters to analyze how the parameters perform on the various events, such as by analyzing the mean response error.

In some embodiments, the multiple starting method of process 808 (shown in FIG. 8) may be combined with the data reuse method, shown here in process 1000.

Other methods may be used to determine which events to include in the sequences and which or how many sequences to use in process 1000. For example, only a subset of events may be used in the sequences of process 1000. This may be based on computational resources, historical data, and/or any other parameters or criteria.

Figure 11:
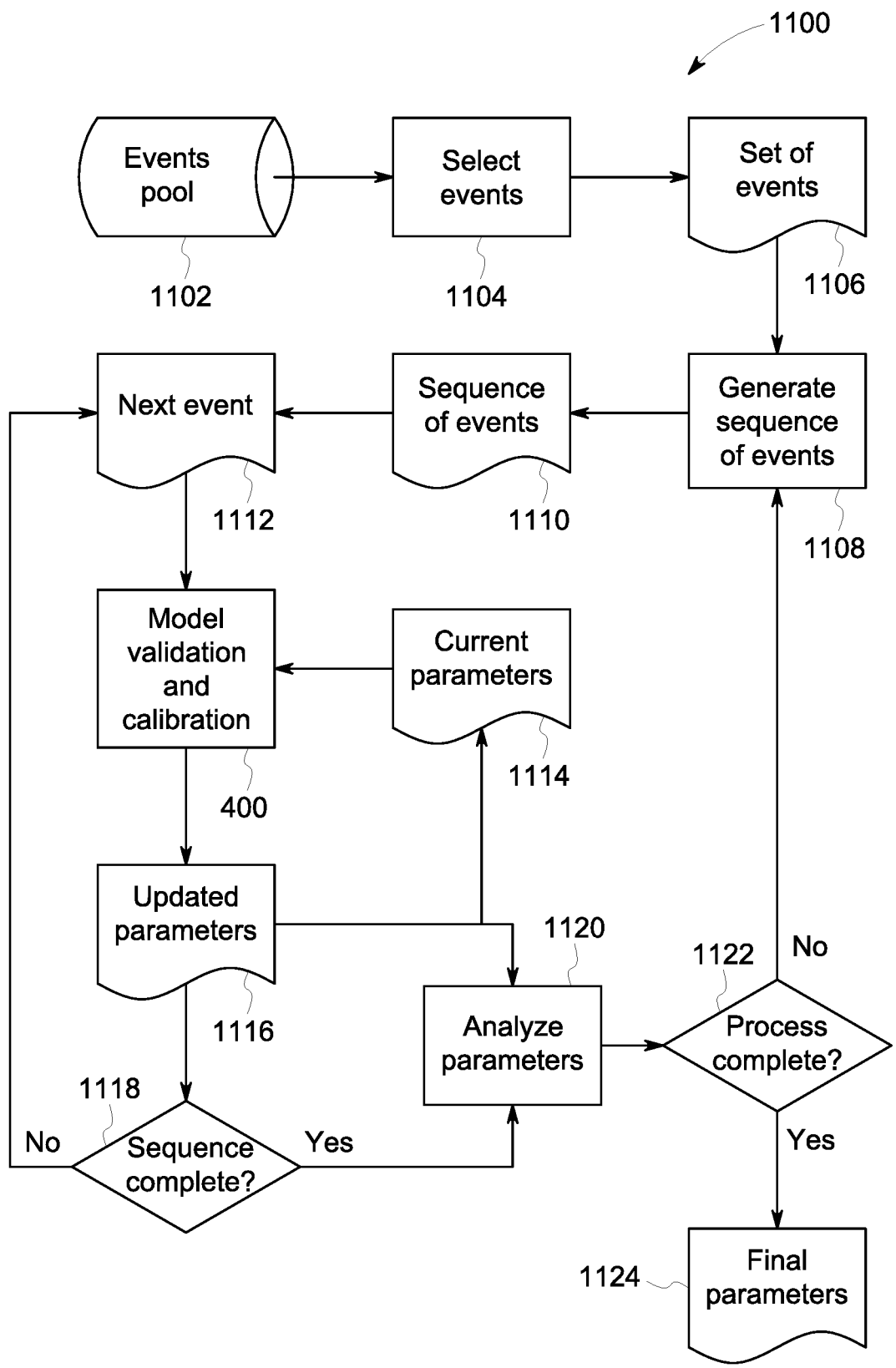
FIG. 11 is a diagram illustrating block diagram of a process of performing model calibration using a data reuse with multiple disturbance events as shown in FIG. 10.

FIG. 11 is a diagram illustrating block diagram of a process 1100 of performing model calibration using a data reuse with multiple disturbance events as shown in FIG. 10.

In process 1100, an event pool 1102 includes a plurality of events. The system 300 selects 1104 a set of events 1106 from the event pool 1102. The system 300 generates 1108 a sequence of events 1110 from that set of events 1106. The system 300 takes the next event 1112 from the sequence of events 1110 and the current parameters 1114 as inputs in the model validation and calibration process 400, to generate updated parameters 1116. The system 300 checks if the sequence is complete 1118. If there are more events in the sequence of events 1110, then the system 300 takes the next event 1112 from the sequence of events 1110 and performs the model validation and calibration process 400.

If all of the events in the sequence of events 1110 have been analyzed, then the system 300 analyzes 1120 the updated parameters 1116 to determine if the process is complete 1122. For example, if the updated parameters 1116 cause the error to be below a specific threshold, have no changed significantly since the last sequence of events 1110 has been performed, or if there have been a sufficient number of sequences of events 1110 analyzed, then the process 1100 ends and the current updated parameters 1116 are considered the final parameters 1124.

In the exemplary embodiment, the system 300 stores a model 702 and 706 (shown in FIG. 7) of a device, such as generate 110 (shown in FIG. 1). The model includes a plurality of parameters. The system 300 receives a plurality of events 708 (shown in FIG. 7) associated with the device. The system 300 sequentially analyzes the plurality of events 708 in a first order 1016 to determine a first set of calibrated parameters 1014 for the model. The system 300 sequentially analyzes the plurality of events in a second order 1018 using the first set of calibrated parameters 1014 to determine a second set of calibrated parameters 1020. The system 300 updates the model to include the second set of calibrated parameters 1020.

In some embodiments, the system 300 determine a residual error between a simulated response and a measured response for the second set of calibrated parameters 1020 and determines whether to sequentially analyze the plurality of events in a third order 1022 based on the residual error. In the exemplary embodiment, the first order 1016, the second order 1018, and the third order 1022 are different.

In some embodiments, the system 300 determines a first residual error between a simulated response and a measured response for the first set of calibrated parameters 1014 and determines a second residual error between a simulated response and a measured response for the second set of calibrated parameters 1020. The system 300 compares the first residual error to the second residual error to determine whether to sequentially analyze the plurality of events 708 in a third order 1022 based on the comparison.

In some embodiments, the system 300 sequentially analyze the plurality of events 708 in a plurality of orders 1016, 1018, 1022, and 1026 to determine a set of calibrated parameters 1028 for the model wherein a residual error between a simulated response and a measured response for the set of calibrated parameters 1028 is below a predetermined threshold.

Embodiment 3: Another Data Reuse Method

Figure 12:
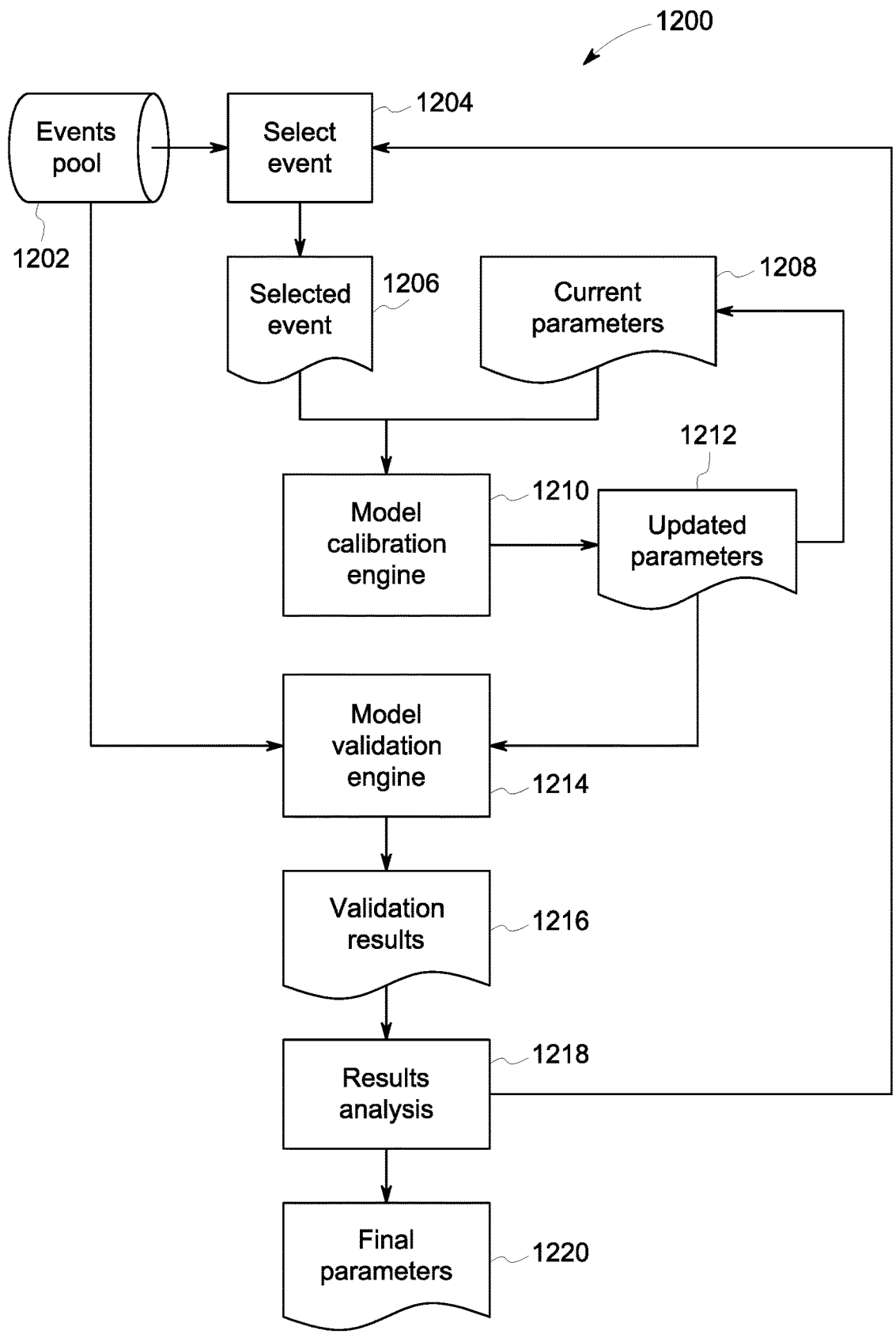
FIG. 12 is a diagram illustrating another method of performing model calibration using a data reuse with multiple disturbance events in accordance with at least one embodiment.

FIG. 12 is a diagram illustrating another process of performing model calibration using a data reuse with multiple disturbance events in accordance with at least one embodiment. In the exemplary embodiment, process 1200 uses the architecture system 300 (shown in FIG. 3) and sub-section 700 (shown in FIG. 7). Furthermore, process 1200 is a variation on process 400 (shown in FIG. 4) and process 600 (shown in FIG. 6).

In the exemplary embodiment, process 1200 is configured to determine a final set of parameters 1220 based on a starting pool of events 1202 using the model validation process 435 and the model calibration process 440 (both shown in FIG. 4). In the exemplary embodiment, process 1200 selects 1204 an event 1206 from a pool of events 1202. In some embodiments, the first event selected is based on one or more criteria provided by a user. The selected event 1206 is combined with a current set of parameters 1208 to be inputs into a model calibration engine 1210. The first time that process 1200 is executed the current parameters 1208 are the initial parameters 802 (shown in FIG. 8). In the exemplary embodiment, the model calibration engine 1210 performs the model validation process 435 to generate a set of updated parameters 1212. The updated parameters 1212 are then used as inputs by the model validation engine 1214, which performs the model validation process 435 on all of the events in the events pool 1202 using the updated parameters 1212. This produces validation results 1216 which are then analyzed 1218. The results analysis 1218 is used to determine if an event is to be selected 1204 or if the updated parameters 1212 are the final parameters 1220.

TABLE 2

| k | Event No. | E1 | E2 | E3 | MRE_max | TMRE |
|---|---|---|---|---|---|---|
| 1 | 1 | 0.1 | 0.2 | 0.3 | 0.3 (E3) | 0.2 |
| 2 | 3 | 0.05 | 0.25 | 0.2 | 0.25 (E2) | 0.15 |
| 3 | 2 | 0.08 | 0.1 | 0.12 | 0.12 (E3) | 0.1 |
| 4 | 3 | 0.12 | 0.08 | 0.1 | 0.12 (E1) | 0.1 |
| 5 | 1 | 0.08 | 0.08 | 0.08 | 0.08 | 0.08 |

TABLE 2 illustrates one cycle through process 1200 to generate the final parameters 1220. As shown above, Event 1 is selected 1204 as the selected event 1206 for the first iteration. Event 1 is used with the initial parameters 1208 and the model calibration engine 1210 to generate a set of updated parameters 1212. The updated parameters 1212 are used to run Events 1, 2, and 3 through the model validation engine 1214. The validation results are shown above, with the mean response error (MRE) for each event being 0.1, 0.2, and 0.3, respectively. The results analysis 1218 determines the maximum MRE, which is 0.3 associated with Event 3, and the mean MRE, which is 0.2. In this embodiment, the process 1200 determines to continue the process and selects 1204 Event 3. The updated parameters 1212 become the current parameters 1208. The current parameters 1208 are combined with selected Event 3 as inputs into the model calibration engine 1210 to generate another set of update parameters 1212. The new set of updated parameters 1212 are compared to the three events using the model validation engine 1214. The results 1216 of this analysis are shown in the row for k equal to 2 with the MREs being 0.05, 0.25, and 0.2, respectively. The Max MRE is 0.25 associated with Event 2, which is then selected 1204 as the next event 1206 to be calibrated.

When Event 2 is used with the model calibration engine 1210, in the third iteration of process 1200, the results of the model validation engine 1214 are 0.08, 0.1, and 0.12 for the three events. In this iteration, the results analysis 1218 selects 1204 Event 3. When Event 3 is used with the model calibration engine 1210, in the fourth iteration of process 1200, the results of the model validation engine 1214 are 0.12, 0.08, and 0.1 for the three events. In this iteration, the results analysis 1218 selects 1204 Event 1.

When Event 1 is used with the model calibration engine 1210, in the fifth iteration of process 1200, the results of the model validation engine 1214 are 0.08, 0.08, and 0.08 for the three events. In this iteration, the results analysis 1218 determines that the process 1200 is complete and sets the latest set of updated parameters 1212 as the final parameters 1220. In some embodiments, process 1200 completes when the MRE is below a threshold. In other embodiments, process 1200 completes when the mean or average of the MRE is below a threshold. In still other embodiments, process 1200 ends when the change in MRE (either max or average) is below a threshold. For example, there is not a significant different between different iterations.

In some embodiments, where multiple events are tied for the maximum MRE, the system chooses which event to select based on one or more additional criterial. While the above example was explained with only three events, the events pool 1202 may contain more events. Furthermore, in some embodiments, the system only chooses a subset of events from the event pool 1202 to analyze in process 1200.

In one embodiment, the initial event is selected based on performing the model validation process 435 on all of the events in the event pool 1202 using the initial parameters and selecting the event based on the event with the largest MRE.

In the exemplary embodiment, the system 300 stores a model 702 and 706 (shown in FIG. 7) of a device, such as a generator 110 (shown in FIG. 1). The model includes a plurality of parameters. The system 300 receives a plurality of events associated with the device. The system 300 receives a first set of calibration values 1208 for the plurality of parameters. The system 300 generates an updated set of calibration values 1212 for the plurality of parameters based on a first event 1206 of the plurality of events 1202 and the first set of calibration values 1208. The system 300 analyzes the updated set of calibration values 1212 based on each event of the plurality of events 1202. The system 300 determines an event 1206 of the plurality of events 1202 to calibrate on based on the analysis. The system 300 generates a second updated set of calibration values 1212 for the plurality of parameters based on the determined event 1206 and the updated set of calibration values 1208.

In some embodiments, the system 300 analyzes the second updated set of calibration values 1212 based on each event of the plurality of events 1202. The system 300 determines whether to update the model to include the second updated set of calibration values 1212 based on the analysis. In some embodiments, the system 300 determines a residual error between a simulated response and a measured response for each event of the plurality of events 1202 in view of the second updated set of calibration values 1212. The system 300 determines the event 1206 to calibrate on next based on the event with the maximum overall residual error. In some embodiments, the system 300 continues selecting events 1204 to analyze until a difference between the plurality of residual errors for a previous event and a current event reaches a predetermined threshold. In other embodiments, the system 300 continues selecting events 1204 to analyze until an average of the plurality of residual errors for a current updated set of calibration values reaches a predetermined threshold.

Figure 13:
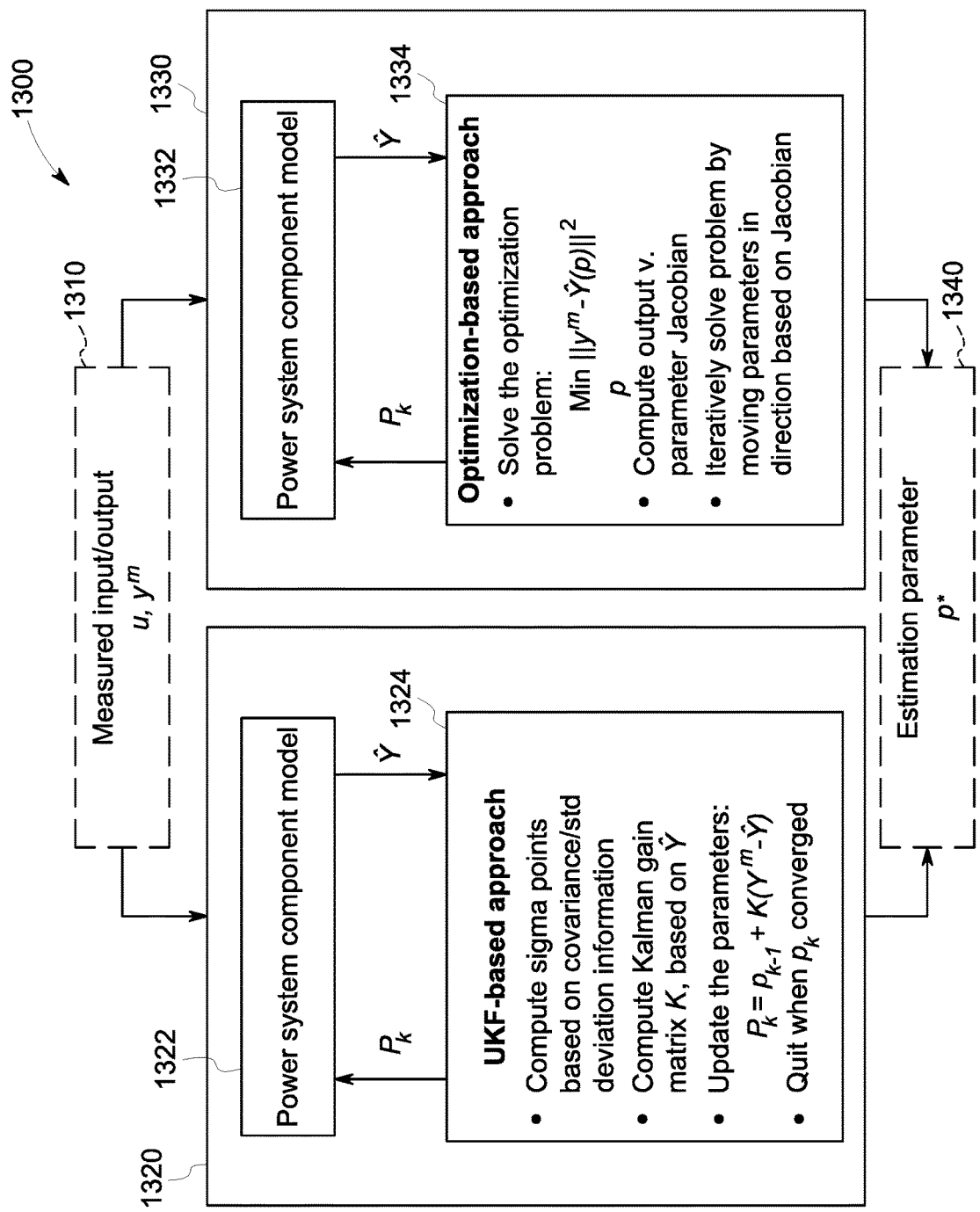
FIG. 13 is a diagram illustrating candidate parameter estimation algorithms in accordance with some embodiments.

FIG. 13 illustrates candidate parameter estimation algorithms 1300 according to some embodiments. In one approach 1320, measured input/output data 1310 (u, y$^m$) may be used by a power system component model 1322 and an UKF based approach 1324 to create an estimation parameter (p*) 1340.

In particular, the system may compute sigma points based on covariance and standard deviation information. The Kalman Gain matrix K may be computed based on $\hat{Y}$ and the parameters may be updated based on:

$$p_k = p_{k-1} + K(y^m - \hat{y})$$

until $p_k$ converges. According to another approach 1330, the measured input/output data 1310 (u, y$^m$) may be used by a power system component model 1332 and an optimization-based approach 1334 to create the estimation parameter (p*) 1340. In this case, the following optimization problem may be solved:

$$\min_p \|y^m - \hat{Y}(p)\|^2$$

The system may then compute output as compared to parameter Jacobian information and iteratively solve the above optimization problem by moving parameters in directions indicated by the Jacobian information.

Figure 14:
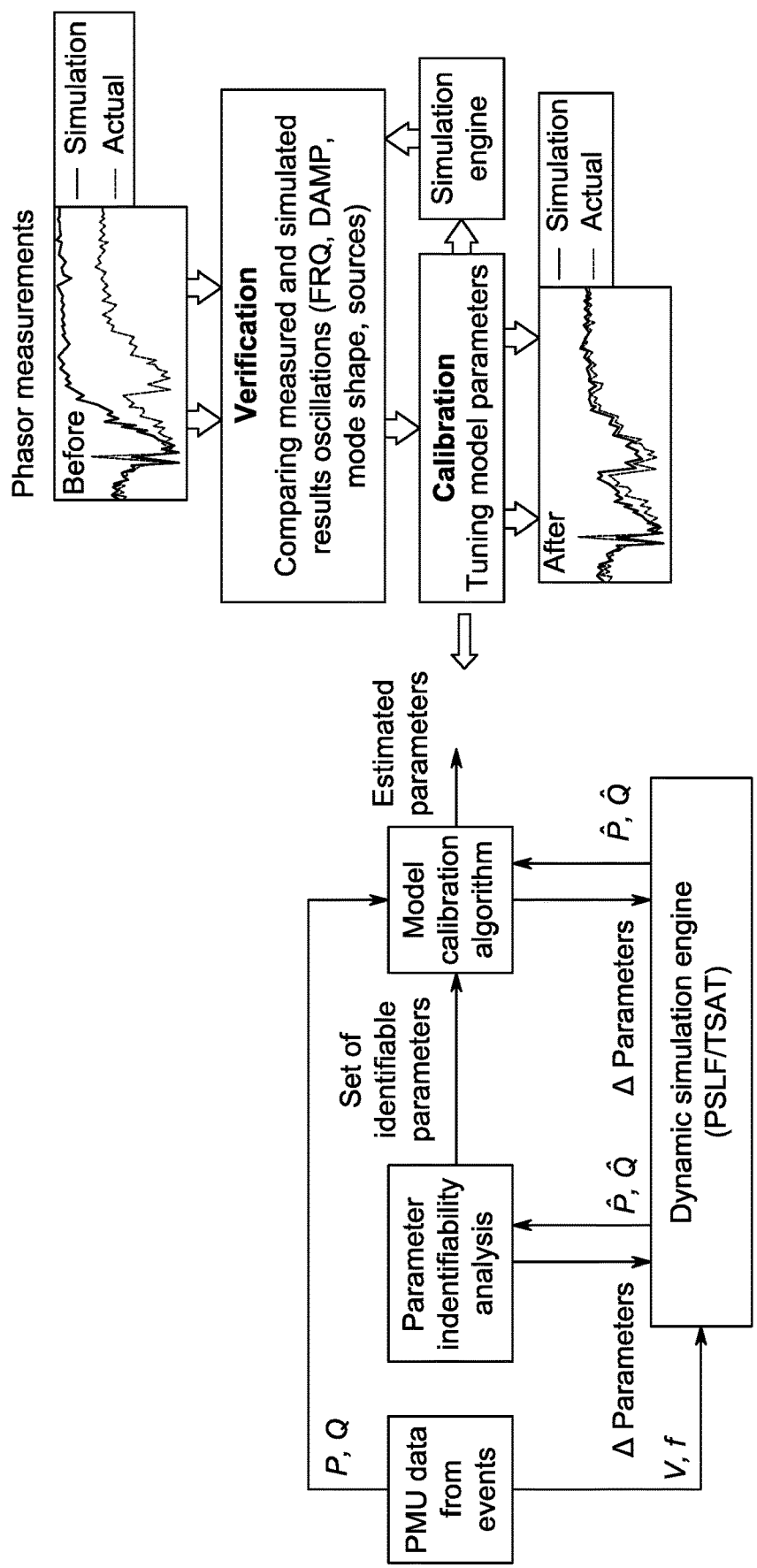
FIG. 14 illustrates a two-stage approach of the process for model calibration.

FIG. 14 illustrates a two-stage approach of the process for model calibration. In this approach, PMU data from events is fed into a dynamic simulation engine. The dynamic simulation engine communicates with a parameter identifiability analysis component and returns the changes to the parameters. The parameter identifiability analysis component also transmits a set of identifiable parameters to a model calibration algorithm component. The model calibration algorithm component uses the set of identifiable parameters, PMU data from events, and other data from the dynamic simulation engine to generate estimated parameters. This approach may be used to calibrate the tuning model parameters.

With the playback simulation capability, the user can compare the response (active power and reactive power) of system models with dynamics observed during disturbances in the system, which is called model validation. The grid disturbance (aka. events) can also be used to correct the system model when simulated response is significantly different from the measured values, which is called model calibration. As shown in the right side of the FIG. 14, the goal is to achieve a satisfactory match between the measurement data and simulated response. If obvious a discrepancy is observed, then the model calibration process may be employed.

The first step of the model calibration process is parameter identification, which aims to identify a subset of parameters with strong sensitivity to the observed event. In the exemplary embodiment, the model calibration process requires a balance on matching in measurement space and reasonableness in the model parameter space. Numerical curve fitting without adequate engineering guidance tends to provide overfitted parameter results, and leads to non-unique sets of parameters (leading to same curve fitting performance), which should be avoided.

Figure 15:
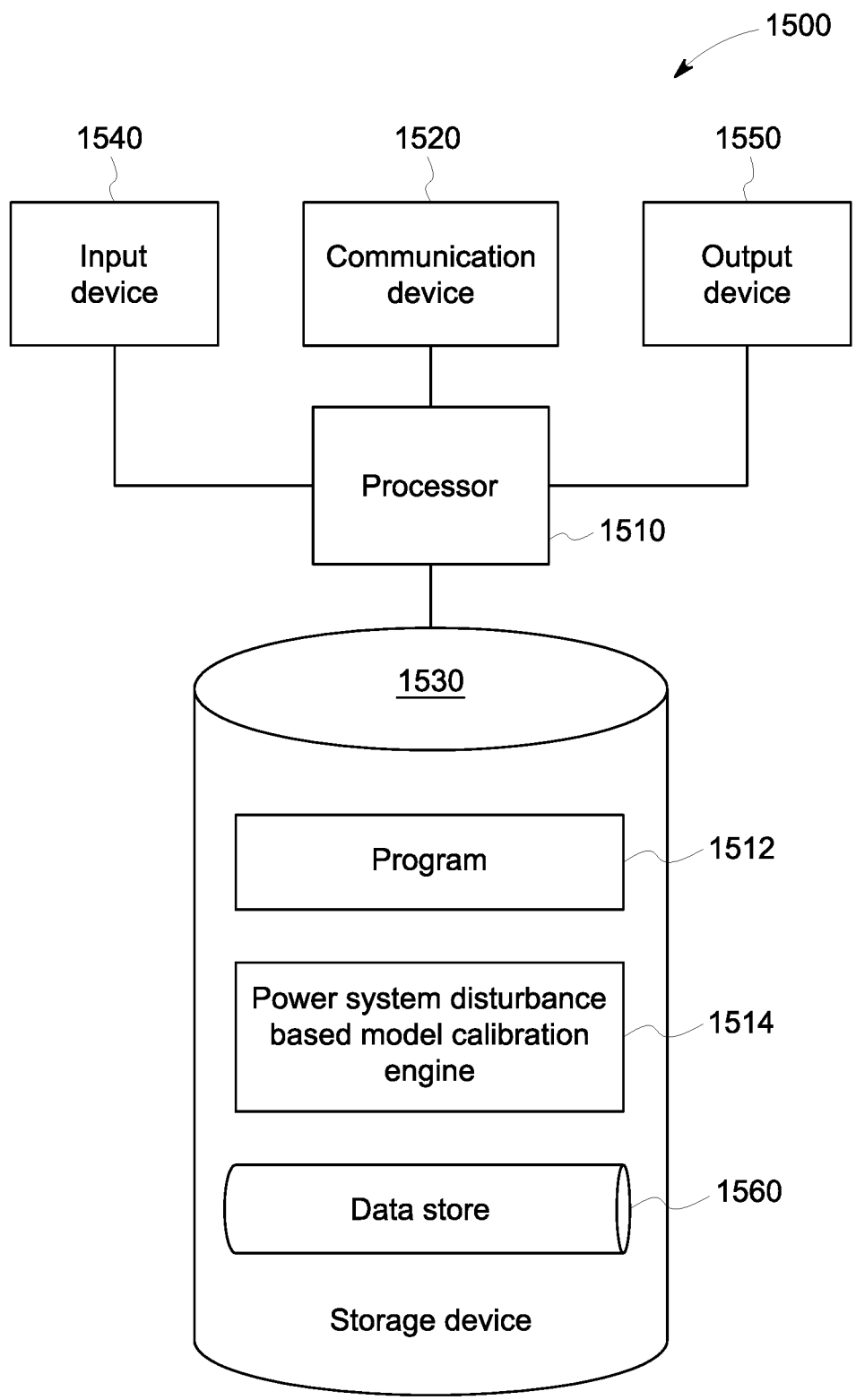
FIG. 15 is a diagram illustrating an exemplary apparatus or platform according to some embodiments.

The embodiments described herein may also be implemented using any number of different hardware configurations. For example, FIG. 15 is a block diagram of an apparatus or platform 1500 that may be, for example, associated with the system 200 of FIG. 2 and/or any other system described herein. The platform 1500 comprises a processor 1510, such as one or more commercially available Central Processing Units ("CPUs") in the form of one-chip microprocessors, coupled to a communication device 1520 configured to communicate via a communication network (not shown in FIG. 15). The communication device 1520 may be used to communicate, for example, with one or more remote measurement units, components, user interfaces, etc. The platform 1500 further includes an input device 1540 (e.g., a computer mouse and/or keyboard to input power grid and/or modeling information) and/an output device 1550 (e.g., a computer monitor to render a display, provide alerts, transmit recommendations, and/or create reports). According to some embodiments, a mobile device, monitoring physical system, and/or PC may be used to exchange information with the platform 1500.

The processor 1510 also communicates with a storage device 1530. The storage device 1530 may comprise any appropriate information storage device, including combinations of magnetic storage devices (e.g., a hard disk drive), optical storage devices, mobile telephones, and/or semiconductor memory devices. The storage device 1530 stores a program 1512 and/or a power system disturbance based model calibration engine 1514 for controlling the processor 1510. The processor 1510 performs instructions of the programs 1512, 1514, and thereby operates in accordance with any of the embodiments described herein. For example, the processor 1510 may calibrate a dynamic simulation engine, having system parameters, associated with a component of an electrical power system (e.g., a generator, wind turbine, etc.). The processor 1510 may receive, from a measurement data store 1560, measurement data measured by an electrical power system measurement unit (e.g., a phasor measurement unit, digital fault recorder, or other means of measuring frequency, voltage, current, or power phasors). The processor 1510 may then pre-condition the measurement data and set-up an optimization problem based on a result of the pre-conditioning. The system parameters of the dynamic simulation engine may be determined by solving the optimization problem with an iterative method until at least one convergence criteria is met. According to some embodiments, solving the optimization problem includes a Jacobian approximation that does not call the dynamic simulation engine if an improvement of residual meets a pre-defined criterion.

The programs 1512, 1514 may be stored in a compressed, uncompiled and/or encrypted format. The programs 1512, 1514 may furthermore include other program elements, such as an operating system, clipboard application, a database management system, and/or device drivers used by the processor 1510 to interface with peripheral devices.

As used herein, information may be "received" by or "transmitted" to, for example: (i) the platform 1500 from another device; or (ii) a software application or module within the platform 1500 from another software application, module, or any other source.

In some other embodiments, the system 300 (shown in FIG. 3) stores a model of a device, such as generator 110. The model includes a plurality of parameters. The system 300 receives a plurality of events 314, 316, and 318 (shown in FIG. 1) associated with the device. In some embodiments, the events 314, 316, and 318 include sensor information of the event 314, 316, and 318 occurring at the device. In other embodiments, the sensor information is associated with a similar device. The system 300 filters the plurality of events to generate a plurality of unique events. The system 300 sequentially analyzes the plurality of unique events to determine a set of calibrated parameters 312 (shown in FIG. 3) for the model. The system 300 updates the model to include the set of calibrated parameters 312.

In some further embodiments, the system 300 executes the model based on one or more events of the plurality of events 314, 316, and 318 to generate one or more results and identifies one or more sensitive parameters, such as tunable parameters based on the one or more results. The system 300 may perform a Bayesian optimization on the one or more sensitive parameters to determine updated values for the one or more sensitive parameters. In these embodiments, the system 300 performs the Bayesian optimization by determining the updated values for the one or more sensitive parameters based on a nonlinear optimization. The objective function of the nonlinear optimization includes two terms. The first term is calculated as the residual between a simulated response based on the calibrated parameter and the measured response. The second term is calculated as a quadratic penalty term for deviations of parameters from one or more previous estimates. The weights for the quadratic penalty are derived from a Bayesian argument. The system 300 derives the quadratic penalty based on a covariance matrix of previous estimated parameters.

In still further embodiments, the system 300 codes each of the plurality of events based on one or more dynamic features of the corresponding event. The one or more dynamic features may include, but or not limited to, one or more of peak value, bottom value, overshoot percentage, a rising time, a settling time, a phase shift, a damping ratio, an energy function, and a cumulative deviation in energy, Fourier transformation spectrum information, principal component, and steady state gain of the corresponding event. The system 300 may extract the one or more dynamic features from a time series of active power, reactive power, voltage and frequency of the corresponding event.

The plurality of events may be each coded into a bit-string. The plurality of events may also be coded into bit vectors. The system 300 compares the plurality of binary vectors using the Taminoto coefficient. Then the system 300 discards similar subsequent events based on a similarity threshold and generates the plurality of unique events based on at least one remaining event.

In some embodiments, the plurality of unique events includes at least a first event, a second event, and a third event. The model includes a first set of parameters. The system 300 executes the model using the first set of parameters and the first event to generate a first set of results. The system 300 analyzes the first set of results to generate a second set of parameters. The system 300 executes the model using the second set of parameters and the second event to generate a second set of results. The system 300 analyzes the second set of results to generate a third set of parameters. The system 300 executes the model using the third set of parameters and the third event to generate a third set of results. The system 300 analyzes the third set of results to generate a fourth set of parameters.

In some further embodiments, the system 300 compares the first set of results, the second set of results, and the third set of results to determine the set of calibrated parameters 312. In these embodiments each set of the results includes residual error between the simulated response and the measured response for each of the one or more sensitive parameters. The system 300 compares the plurality of residual errors to select the set of calibrated parameters with minimal overall residual error.

At least one of the technical solutions to the technical problems provided by this system may include: (i) improved speed in modeling parameters; (ii) more robust models in response to measurement noise; (iii) compliance with NERC mandated grid reliability requirements; (iv) reduce the chance that an important parameter is not updated; (v) improved accuracy in parameter identifiability; (vi) improved accuracy in parameter estimation; and (vii) improved optimization of parameters based on event training.

The methods and systems described herein may be implemented using computer programming or engineering techniques including computer software, firmware, hardware, or any combination or subset thereof, wherein the technical effects may be achieved by performing at least one of the following steps: (a) store a model of a device, wherein the model includes a plurality of parameters; (b) receive a plurality of events associated with the device; (c) receive a first set of calibration values for the plurality of parameters; (d) generate a plurality of sets of calibration values for the plurality of parameters; (e) for each of the plurality of sets of calibration values, analyze a first event of the plurality of events using the corresponding set of calibration values to generate a corresponding updated set of calibration values; (f) analyze the plurality of updated sets of calibration values to determine a current updated set of calibration values; and (g) update the model to include the current updated set of calibration values.

In other embodiments, the technical effects may be achieved by performing at least one of the following steps: (a) store a model of a device, wherein the model includes a plurality of parameters; (b) receive a plurality of events associated with the device; (c) sequentially analyze the plurality of events in a first order to determine a first set of calibrated parameters for the model; (d) sequentially analyze the plurality of events in a second order using the first set of calibrated parameters to determine a second set of calibrated parameters; and (e) update the model to include the second set of calibrated parameters.

In still other embodiments, the technical effects may be achieved by performing at least one of the following steps: (a) store a model of a device, wherein the model includes a plurality of parameters; (b) receive a plurality of events associated with the device; (c) receive a first set of calibration values for the plurality of parameters; (d) generate an updated set of calibration values for the plurality of parameters based on a first event of the plurality of events and the first set of calibration values; (e) analyze the updated set of calibration values based on each event of the plurality of events; (0 determine an event of the plurality of events to calibrate on based on the analysis; and (g) generate a second updated set of calibration values for the plurality of parameters based on the determined event and the updated set of calibration values.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may employ artificial intelligence and/or be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image data, text data, report data, and/or numerical analysis. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the computer device, the user of the computer device, the computer network hosting the computer device, services executing on the computer device, and/or other data.

Based upon these analyses, the processing element may learn how to identify characteristics and patterns that may then be applied to training models, analyzing sensor data, and detecting abnormalities.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). In still yet a further embodiment, the system is run on Android® OS (Android is a registered trademark of Google, Inc. of Mountain View, Calif.). In another embodiment, the system is run on Linux® OS (Linux is a registered trademark of Linus Torvalds of Boston, Mass.). The application is flexible and designed to run in various different environments without compromising any major functionality.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for enhanced sequential power system model calibration comprising a computing device including at least one processor in communication with at least one memory device, wherein the at least one processor is programmed to:
   store a model of a device, wherein the model includes a plurality of parameters;
   receive a plurality of events associated with the device;
   filter the plurality of events to determine a plurality of unique events including a first event and a second event;
   receive a first set of calibration values for the plurality of parameters;
   generate a first plurality of sets of calibration values for the plurality of parameters based on the first set of calibration values;
   for each set of the first plurality of calibration values of the first plurality of sets of calibration values, execute the model to analyze the first event of the plurality of unique events using a corresponding set of calibration values to generate one of a first plurality of sets of output parameters;
   analyze the first plurality of output parameters to determine a current updated set of calibration values based on an optimization of the plurality of parameters, wherein the current updated set of calibration values corresponds to a set of the first plurality of calibration values;
   generate a second plurality of sets of calibrations values based on the current updated set of calibration values;
   for each set of the second plurality of sets of calibration values, execute the model analyze the second event of the plurality of unique events using a corresponding set of calibration values to generate a second plurality of sets of output parameters;
   analyze the second plurality of output parameters to further update the current updated set of calibration values based on an optimization of the plurality of parameters, wherein the current updated set of calibration values corresponds to a set of the second plurality of calibration values, and wherein the current further updated set of calibration values is to be used in the analysis of a third event of the plurality of unique events; and
   update the model to include the current updated set of calibration values.

2. The system in accordance with claim 1, wherein the at least one processor is further programmed to generate the plurality of sets of calibration values based on the first set of calibration values.

3. The system in accordance with claim 2, wherein the at least one processor is further programmed to generate a plurality of sets of calibration values based a random perturbation of the first set of calibration values.

4. The system in accordance with claim 2, wherein the at least one processor is further programmed to generate a plurality of sets of calibration values based a multivariate normal random generation around a mean and standard deviation of the first set of calibration values.

5. They system in accordance with claim 1, wherein the at least one processor is further programmed to analyze the first event using parameter estimation.

6. The system in accordance with claim 1, wherein the at least one processor is further programmed to analyze the first event using the first set of calibration values to generate a updated first set of calibration values.

7. The system in accordance with claim 6, wherein the at least one processor is further programmed to analyze the plurality of updated sets of calibration values and the updated first set of calibration values to determine the current updated set of calibration values.

8. The system in accordance with claim 1, wherein the at least one processor is further programmed to:
   for each of the first plurality of output parameters, determine a corresponding residual error between a simulated response and a measured response; and
   analyze the plurality of output parameters to select the updated set of calibration values with minimal overall residual error as the current updated set of calibration values.

9. The system in accordance with claim 1, wherein the at least one processor is further programmed to sequentially analyze the plurality of unique events where the updated set of calibration values associated with an event are used as an input to analyze a subsequent event of the plurality of unique events.

10. The system in accordance with claim 1, wherein the plurality of events includes sensor data associated with the device during a corresponding event.

11. The system in accordance with claim 1, wherein the device includes a power system and the model simulates behavior of the power system.

12. The system in accordance with claim 1, wherein the at least one processor is further programmed to reanalyze the plurality of filtered events by rearranging the order of the plurality of filtered events.

13. A system for enhanced sequential power system model calibration comprising a computing device including at least one processor in communication with at least one memory device, wherein the at least one processor is programmed to:
   store a model of a device, wherein the model includes a plurality of parameters; receive a plurality of events associated with the device;

filter the plurality of events to determine a plurality of unique events including a first event and a second event;

sequentially analyze the plurality of unique events in a first order to determine a first set of calibrated parameters for the model by generating and analyzing a plurality of sets of calibration values for each event of the plurality of unique events;

sequentially analyze the plurality of unique events in a second order using the first set of calibrated parameters to determine a second set of calibrated parameters by generating and analyzing a first plurality of sets of calibration values for each event of the plurality of unique events;

update the model to include the second set of calibrated parameters; analyze the first and second set of calibrated parameters to determine a current updated set of calibration values based on an optimization of a plurality of parameters, wherein the current updated set of calibration values corresponds to a set of the first plurality of calibration values; generate a second plurality of sets of calibrations values based on the current updated set of calibration values;

for each set of the second plurality of sets of calibration parameters, execute a model analyze the second event of the plurality of unique events using a corresponding set of calibration values to generate a first and a second plurality of sets of output parameters:

analyze the second plurality of output parameters to further update the current updated set of calibration values based on an optimization of the plurality of parameters, wherein the current updated set of calibration values corresponds to a set of the second plurality of calibration values, and wherein the current further updated set of calibration values is to be used in the analysis of a third event of the plurality of unique events; and update the model to include the current updated set of calibration values.

14. The system in accordance with claim 13, wherein the at least one processor is further programmed to:

determine a residual error between a simulated response and a measured response for the second set of calibrated parameters; and determine whether to sequentially analyze the plurality of unique events in a third order based on the residual error.

15. The system in accordance with claim 14, wherein the first order, the second order, and the third order are different.

16. The system in accordance with claim 13, wherein the at least one processor is further programmed to:

determine a first residual error between a simulated response and a measured response for the first set of calibrated parameters;

determine a second residual error between a simulated response and a measured response for the second set of calibrated parameters;

compare the first residual error to the second residual error; and determine whether to sequentially analyze the plurality of unique events in a third order based on the comparison.

17. The system in accordance with claim 13, wherein the at least one processor is further programmed to sequentially analyze the plurality of unique events in a plurality of orders to determine a set of calibrated parameters for the model wherein a residual error between a simulated response and a measured response for the set of calibrated parameters is below a predetermined threshold.

18. A system for enhanced sequential power system model calibration comprising a computing device including at least one processor in communication with at least one memory device, wherein the at least one processor is programmed to:

store a model of a device, wherein the model includes a plurality of parameters;

receive a plurality of events associated with the device;

filter the plurality of events to determine a plurality of unique events including a first event and a second event;

receive a first set of calibration values for the plurality of parameters;

generate an updated set of calibration values for the plurality of parameters based on the first event of the plurality of unique events and the first set of calibration values;

analyze the updated set of calibration values based on each event of the plurality of unique events;

determine an event of the plurality of unique events to calibrate on based on the analysis;

generate a second updated set of calibration values for the plurality of parameters based on the determined event and the updated set of calibration values;

analyze a first and a second set of calibrated parameters to determine a current updated set of calibration values based on an optimization of a plurality of parameters of the first and the second set of calibrated parameters, wherein the current updated set of calibration values corresponds to a set of the first set of calibration values;

generate a second sets of calibrations values based on the current updated set of calibration values;

for each set of the second set of calibration parameters, execute a model analyze the second event of the plurality of unique events using a corresponding set of calibration values to generate a first and a second plurality of sets of output parameters:

analyze the second plurality of output parameters to further update the current updated set of calibration values based on an optimization of the plurality of parameters, wherein the current updated set of calibration values corresponds to the second set of calibration values, and wherein the current further updated set of calibration values is to be used in the analysis of a third event of the plurality of unique events; and update the model to include the current updated set of calibration values.

19. The system in accordance with claim 18, wherein the at least one processor is further programmed to analyze the second updated set of calibration values based on each event of the plurality of unique events.

20. The system in accordance with claim 19, wherein the at least one processor is further programmed to determine whether to update the model to include the second updated set of calibration values based on the analysis.

21. The system in accordance with claim 19, wherein the at least one processor is further programmed to:

determine a residual error between a simulated response and a measured response for each event of the plurality of unique events in view of the second updated set of calibration values; and determine the event to calibrate on next based on the event with the maximum overall residual error.

22. The system in accordance with claim 21, wherein the at least one processor is further programmed to continue selecting events to analyze until a difference between the plurality of residual errors for a previous event and a current event reaches a predetermined threshold.

23. The system in accordance with claim 21, wherein the at least one processor is further programmed to continue selecting events to analyze until an average of the plurality of residual errors for a current updated set of calibration values reaches a predetermined threshold.

* * * * *